US00RE43690E

(19) United States
(12) Reissued Patent
Schneider et al.

(10) Patent Number: US RE43,690 E
(45) Date of Reissued Patent: Sep. 25, 2012

(54) SEARCH ENGINE REQUEST METHOD, PRODUCT, AND APPARATUS

(75) Inventors: Eric Schneider, Delray Beach, FL (US); Steven Schneider, Berry Creek, CA (US); Daniel V. Heintz, Cleveland Heights, OH (US)

(73) Assignee: ESDR Network Solutions LLC, Wilmington, DE (US)

(21) Appl. No.: 12/044,804

(22) Filed: Mar. 7, 2008

Related U.S. Patent Documents

Reissue of:
(64) Patent No.: 7,010,568
Issued: Mar. 7, 2006
Appl. No.: 09/643,584
Filed: Aug. 22, 2000

U.S. Applications:
(63) Continuation-in-part of application No. 09/532,500, filed on Mar. 21, 2000, now Pat. No. 7,136,932, and a continuation-in-part of application No. 09/525,350, filed on Mar. 15, 2000, now Pat. No. 6,338,082.

(60) Provisional application No. 60/152,015, filed on Sep. 1, 1999, provisional application No. 60/153,594, filed on Sep. 13, 1999, provisional application No. 60/143,859, filed on Jul. 15, 1999, provisional application No. 60/135,751, filed on May 25, 1999, provisional application No. 60/125,531, filed on Mar. 22, 1999.

(51) Int. Cl.
*G06F 15/16* (2006.01)

(52) U.S. Cl. . 709/203; 709/217; 709/219; 707/999.003; 707/999.01

(58) Field of Classification Search ..... 709/203, 709/217–219, 223–224; 707/999.003, 999.01
See application file for complete search history.

(56) References Cited

U.S. PATENT DOCUMENTS

| | | | |
|---|---|---|---|
| 4,155,042 | A | 5/1979 | Permut et al. |
| 4,190,800 | A | 2/1980 | Kelly, Jr. et al. |
| 4,196,310 | A | 4/1980 | Forman et al. |
| 4,390,876 | A | 6/1983 | Bjorklund et al. |
| 4,486,853 | A | 12/1984 | Parsons |
| 4,754,326 | A | 6/1988 | Kram et al. |
| 4,811,382 | A | 3/1989 | Sleevi |

(Continued)

FOREIGN PATENT DOCUMENTS

| | | |
|---|---|---|
| JP | 54136617 | 10/1979 |

(Continued)

OTHER PUBLICATIONS

Crow, R., the Telephone Exchange Name Project, Web Site (1998), from http:--ourwebhome.com-TENP-TENproject.html.

(Continued)

*Primary Examiner* — Philip B Tran
(74) *Attorney, Agent, or Firm* — Fitch, Even, Tabin & Flannery, LLP

(57) ABSTRACT

An accessible URI may be generated in response to determining that an existing valid URI is inaccessible. When a valid URI is determined to be not accessible, then a valid URI may be generated to access content by extracting keywords from the non-query component URI (e.g., directory, domain, port, or fragment, etc.) of the inaccessible URI and using such keywords as a search request or as the query portion of the generated accessible URI.

35 Claims, 9 Drawing Sheets

U.S. PATENT DOCUMENTS

| | | | | |
|---|---|---|---|---|
| 4,823,265 | A | | 4/1989 | Nelson |
| 4,903,206 | A | | 2/1990 | Itoh et al. |
| 4,956,771 | A | | 9/1990 | Nuestaedter |
| 4,956,875 | A | | 9/1990 | Bernard et al. |
| 5,109,486 | A | | 4/1992 | Seymour |
| 5,155,837 | A | | 10/1992 | Liu et al. |
| 5,155,847 | A | | 10/1992 | Kirouac et al. |
| 5,175,681 | A | | 12/1992 | Iwai et al. |
| 5,231,570 | A | | 7/1993 | Lee |
| 5,249,230 | A | | 9/1993 | Mihm, Jr. |
| 5,249,275 | A | | 9/1993 | Srivastava |
| 5,319,699 | A | | 6/1994 | Kerihuel et al. |
| 5,321,740 | A | | 6/1994 | Gregorek et al. |
| 5,386,369 | A | | 1/1995 | Christiano |
| 5,402,490 | A | | 3/1995 | Mihm, Jr. |
| 5,404,231 | A | | 4/1995 | Bloomfield |
| 5,404,505 | A | | 4/1995 | Levinson |
| 5,418,951 | A | | 5/1995 | Damashek |
| 5,437,031 | A | | 7/1995 | Kitami |
| 5,444,823 | A | | 8/1995 | Nguyen |
| 5,446,891 | A | | 8/1995 | Kaplan et al. |
| 5,454,105 | A | | 9/1995 | Hatakeyama et al. |
| 5,500,561 | A | | 3/1996 | Wilhelm |
| 5,534,734 | A | | 7/1996 | Pugh et al. |
| 5,535,257 | A | | 7/1996 | Goldberg et al. |
| 5,544,036 | A | | 8/1996 | Brown, Jr. et al. |
| 5,572,438 | A | | 11/1996 | Ehlers et al. |
| 5,576,700 | A | | 11/1996 | Davis et al. |
| 5,592,620 | A | | 1/1997 | Chen et al. |
| 5,598,464 | A | | 1/1997 | Hess et al. |
| 5,600,778 | A | | 2/1997 | Swanson et al. |
| 5,603,034 | A | | 2/1997 | Swanson |
| 5,623,679 | A | | 4/1997 | Rivette et al. |
| 5,623,681 | A | | 4/1997 | Rivette et al. |
| 5,625,818 | A | | 4/1997 | Zarmer et al. |
| 5,634,016 | A | | 5/1997 | Steadham, Jr. et al. |
| 5,634,048 | A | | 5/1997 | Ryu et al. |
| 5,640,561 | A | | 6/1997 | Satoh et al. |
| 5,644,625 | A | | 7/1997 | Solot |
| 5,649,186 | A | | 7/1997 | Ferguson |
| 5,664,170 | A | | 9/1997 | Taylor |
| 5,673,252 | A | | 9/1997 | Johnson et al. |
| 5,684,710 | A | | 11/1997 | Ehlers et al. |
| 5,692,132 | A | | 11/1997 | Hogan |
| 5,696,695 | A | | 12/1997 | Ehlers et al. |
| 5,699,428 | A | | 12/1997 | McDonnal et al. |
| 5,701,399 | A | | 12/1997 | Lee et al. |
| 5,708,709 | A | | 1/1998 | Rose |
| 5,721,897 | A | | 2/1998 | Rubinstein |
| 5,742,818 | A | | 4/1998 | Shoroff et al. |
| 5,745,360 | A | | 4/1998 | Leone et al. |
| 5,761,083 | A | | 6/1998 | Brown, Jr. et al. |
| 5,761,689 | A | | 6/1998 | Rayson et al. |
| 5,764,906 | A | | 6/1998 | Edelstein et al. |
| 5,778,367 | A | | 7/1998 | Wesinger, Jr. et al. |
| 5,790,790 | A | | 8/1998 | Smith et al. |
| 5,802,524 | A | | 9/1998 | Flowers et al. |
| 5,812,776 | A | | 9/1998 | Gifford |
| 5,813,007 | A | | 9/1998 | Nielsen |
| 5,815,830 | A | | 9/1998 | Anthony |
| 5,835,087 | A | | 11/1998 | Herz et al. |
| 5,841,850 | A | | 11/1998 | Fan |
| 5,842,203 | A | | 11/1998 | D'Elena et al. |
| 5,848,396 | A | | 12/1998 | Gerace |
| 5,857,201 | A | | 1/1999 | Wright, Jr. et al. |
| 5,870,546 | A | * | 2/1999 | Kirsch ..... 709/219 |
| 5,881,131 | A | | 3/1999 | Farris et al. |
| 5,890,172 | A | | 3/1999 | Borman et al. |
| 5,892,919 | A | | 4/1999 | Nielsen |
| 5,892,920 | A | | 4/1999 | Arvidsson et al. |
| 5,895,454 | A | | 4/1999 | Harrington |
| 5,898,836 | A | | 4/1999 | Freivald et al. |
| 5,907,680 | A | | 5/1999 | Nielsen |
| 5,908,467 | A | | 6/1999 | Barrett et al. |
| 5,913,215 | A | | 6/1999 | Rubinstein et al. |
| 5,926,116 | A | | 7/1999 | Kitano et al. |
| 5,933,604 | A | | 8/1999 | Inakoshi |
| 5,937,037 | A | | 8/1999 | Kamel et al. |
| 5,937,162 | A | | 8/1999 | Funk et al. |
| 5,940,847 | A | | 8/1999 | Fein et al. |
| 5,944,787 | A | | 8/1999 | Zoken |
| 5,949,419 | A | | 9/1999 | Domine et al. |
| 5,953,400 | A | | 9/1999 | Rosenthal et al. |
| 5,953,721 | A | | 9/1999 | Doi et al. |
| 5,963,205 | A | | 10/1999 | Sotomayor |
| 5,963,915 | A | | 10/1999 | Kirsch |
| 5,970,680 | A | | 10/1999 | Powers |
| 5,974,453 | A | | 10/1999 | Andersen et al. |
| 5,978,806 | A | | 11/1999 | Lund |
| 5,978,817 | A | | 11/1999 | Giannandrea et al. |
| 5,978,828 | A | | 11/1999 | Greer et al. |
| 5,978,842 | A | | 11/1999 | Noble et al. |
| 5,982,863 | A | | 11/1999 | Smiley et al. |
| 5,987,464 | A | | 11/1999 | Schneider |
| 5,987,508 | A | | 11/1999 | Agraharam et al. |
| 5,991,368 | A | | 11/1999 | Quatse et al. |
| 5,991,751 | A | | 11/1999 | Rivette et al. |
| 5,995,594 | A | | 11/1999 | Shaffer et al. |
| 5,999,907 | A | | 12/1999 | Donner |
| 5,999,912 | A | | 12/1999 | Wodarz et al. |
| 6,003,061 | A | | 12/1999 | Jones et al. |
| 6,003,077 | A | | 12/1999 | Bawden et al. |
| 6,003,082 | A | | 12/1999 | Gampper et al. |
| 6,006,264 | A | | 12/1999 | Colby et al. |
| 6,006,265 | A | | 12/1999 | Rangan et al. |
| 6,009,150 | A | | 12/1999 | Kamel |
| 6,009,459 | A | | 12/1999 | Belfiore |
| 6,012,066 | A | | 1/2000 | Discount et al. |
| 6,014,660 | A | | 1/2000 | Lim et al. |
| 6,018,619 | A | | 1/2000 | Allard et al. |
| 6,018,768 | A | | 1/2000 | Ullman et al. |
| 6,021,433 | A | | 2/2000 | Payne et al. |
| 6,023,724 | A | | 2/2000 | Bhatia et al. |
| 6,029,195 | A | | 2/2000 | Herz |
| 6,032,150 | A | | 2/2000 | Nguyen |
| 6,038,601 | A | | 3/2000 | Lambert et al. |
| 6,041,324 | A | | 3/2000 | Earl et al. |
| 6,057,834 | A | | 5/2000 | Pickover |
| 6,058,250 | A | | 5/2000 | Harwood et al. |
| 6,058,355 | A | | 5/2000 | Ahmed et al. |
| 6,061,700 | A | | 5/2000 | Brobst et al. |
| 6,061,734 | A | | 5/2000 | London |
| 6,061,738 | A | | 5/2000 | Osaku et al. |
| 6,085,242 | A | | 7/2000 | Chandra |
| 6,091,956 | A | | 7/2000 | Hollenberg |
| 6,092,100 | A | | 7/2000 | Berstis et al. |
| 6,094,665 | A | | 7/2000 | Lyons et al. |
| 6,097,108 | A | | 8/2000 | Tweed |
| 6,098,099 | A | | 8/2000 | Ellesson et al. |
| 6,104,582 | A | | 8/2000 | Cannon et al. |
| 6,104,990 | A | | 8/2000 | Chaney et al. |
| 6,105,098 | A | | 8/2000 | Ninose et al. |
| 6,119,153 | A | | 9/2000 | Dujari et al. |
| 6,119,234 | A | | 9/2000 | Aziz et al. |
| 6,122,520 | A | | 9/2000 | Want et al. |
| 6,122,627 | A | | 9/2000 | Carey et al. |
| 6,125,361 | A | | 9/2000 | Chakrabarti et al. |
| 6,128,623 | A | | 10/2000 | Mattis et al. |
| 6,134,588 | A | | 10/2000 | Guenthner et al. |
| 6,137,873 | A | | 10/2000 | Gilles |
| 6,141,408 | A | | 10/2000 | Garfinkle |
| 6,141,653 | A | | 10/2000 | Conklin et al. |
| 6,148,289 | A | | 11/2000 | Virdy |
| 6,148,342 | A | | 11/2000 | Ho |
| 6,151,624 | A | | 11/2000 | Teare et al. |
| 6,154,600 | A | | 11/2000 | Newman et al. |
| 6,154,725 | A | | 11/2000 | Donner |
| 6,154,771 | A | | 11/2000 | Rangan et al. |
| 6,154,777 | A | | 11/2000 | Ebrahim |
| 6,157,292 | A | | 12/2000 | Piercy et al. |
| 6,167,389 | A | | 12/2000 | Davis et al. |
| 6,167,449 | A | | 12/2000 | Arnold et al. |
| 6,169,476 | B1 | | 1/2001 | Flanagan |
| 6,173,406 | B1 | | 1/2001 | Wang et al. |
| 6,181,787 | B1 | | 1/2001 | Malik |
| 6,181,985 | B1 | | 1/2001 | O'Donnell et al. |
| 6,182,148 | B1 | | 1/2001 | Tout |

6,182,227 B1 1/2001 Blair et al.
6,185,619 B1 2/2001 Joffe et al.
6,189,030 B1 2/2001 Kirsch et al.
6,195,691 B1 2/2001 Brown
6,199,076 B1 3/2001 Logan et al.
6,202,087 B1 3/2001 Gadish
6,205,139 B1 3/2001 Voit
6,209,048 B1 3/2001 Wolff
6,212,565 B1 4/2001 Gupta
6,219,696 B1 4/2001 Wynblatt et al.
6,219,709 B1 4/2001 Byford
6,229,532 B1 5/2001 Fujii
6,230,168 B1 5/2001 Unger et al.
6,240,360 B1 5/2001 Phelan
6,240,555 B1 5/2001 Shoff et al.
6,249,817 B1 6/2001 Nakabayashi et al.
6,256,671 B1 7/2001 Strentzsch et al.
6,256,739 B1 7/2001 Skopp et al.
6,259,771 B1 7/2001 Kredo et al.
6,259,972 B1 7/2001 Sumic et al.
6,269,361 B1 7/2001 Davis et al.
6,282,511 B1 8/2001 Mayer
6,292,172 B1 9/2001 Makhlouf
6,292,709 B1 9/2001 Uhl et al.
6,297,819 B1 10/2001 Furst
6,298,327 B1 10/2001 Hunter et al.
6,298,341 B1 10/2001 Mann et al.
6,298,352 B1 10/2001 Kannan et al.
6,311,214 B1 10/2001 Rhoads
6,314,469 B1 11/2001 Tan et al.
6,321,222 B1 11/2001 Soderstrom et al.
6,321,242 B1 11/2001 Fogg et al.
6,324,538 B1 11/2001 Wesinger, Jr. et al.
6,324,585 B1 11/2001 Zhang et al.
6,324,650 B1 11/2001 Ogilvie
6,332,141 B2 12/2001 Gonzalez et al.
6,332,158 B1 12/2001 Risley et al.
6,338,082 B1 1/2002 Schneider
6,339,767 B1 1/2002 Rivette et al.
6,339,786 B1 1/2002 Ueda et al.
6,356,422 B1 3/2002 Bilac et al.
6,356,898 B2 3/2002 Cohen et al.
6,360,256 B1 3/2002 Lim
6,363,433 B1 3/2002 Nakajima
6,366,298 B1 4/2002 Haitsuka et al.
6,366,906 B1 4/2002 Hoffman
6,381,627 B1 4/2002 Kwan et al.
6,381,651 B1 4/2002 Nishio et al.
6,385,620 B1 5/2002 Kurzius et al.
6,389,462 B1 5/2002 Cohen et al.
6,393,117 B1 5/2002 Trell
6,401,118 B1 6/2002 Thomas
6,405,243 B1 6/2002 Nielsen
6,412,014 B1 6/2002 Ryan
6,421,675 B1 7/2002 Ryan et al.
6,427,164 B1 7/2002 Reilly
6,430,623 B1 8/2002 Alkhatib
6,434,547 B1 8/2002 Mishelevich et al.
6,438,583 B1 8/2002 McDowell et al.
6,442,549 B1 8/2002 Schneider
6,442,602 B1 8/2002 Choudhry
6,449,657 B2 9/2002 Stanbach, Jr. et al.
6,452,609 B1 9/2002 Katinsky et al.
6,496,981 B1 12/2002 Wistendahl et al.
6,502,131 B1 12/2002 Vaid et al.
6,502,132 B1 12/2002 Kumano et al.
6,505,201 B1 1/2003 Haitsuka et al.
6,509,833 B2 1/2003 Tate
6,510,461 B1 1/2003 Nielsen
6,513,060 B1 1/2003 Nixon et al.
6,519,589 B2 2/2003 Mann et al.
6,526,402 B2 2/2003 Ling
6,532,366 B1 3/2003 Chung et al.
6,549,892 B1 4/2003 Sansone
6,556,992 B1 4/2003 Barney et al.
6,560,634 B1 5/2003 Broadhurst
6,574,737 B1 6/2003 Kingsford et al.
6,578,078 B1 * 6/2003 Smith et al. ..... 709/224
6,591,291 B1 7/2003 Gabber et al.
6,594,697 B1 7/2003 Praitis et al.
6,603,844 B1 8/2003 Chavez, Jr. et al.
6,604,132 B1 8/2003 Hitt
6,605,120 B1 8/2003 Fields et al.
6,606,659 B1 8/2003 Hegli et al.
6,608,891 B1 8/2003 Pelletier et al.
6,611,803 B1 8/2003 Furuyama et al.
6,615,237 B1 9/2003 Kyne et al.
6,615,247 B1 9/2003 Murphy
6,615,348 B1 9/2003 Gibbs
6,618,697 B1 9/2003 Kantrowitz et al.
6,618,726 B1 9/2003 Colbath et al.
6,628,314 B1 9/2003 Hoyle
6,636,854 B2 10/2003 Dutta et al.
6,636,961 B1 10/2003 Braun et al.
6,637,032 B1 10/2003 Feinleib
6,650,877 B1 11/2003 Tarbouriech et al.
6,654,741 B1 11/2003 Cohen et al.
6,654,746 B1 11/2003 Wong et al.
6,654,779 B1 11/2003 Tsuei
6,665,620 B1 12/2003 Burns et al.
6,668,278 B1 12/2003 Yen et al.
6,671,585 B2 12/2003 Lof et al.
6,671,714 B1 12/2003 Weyer et al.
6,671,738 B1 12/2003 Rajchel et al.
6,674,993 B1 1/2004 Tarbouriech
6,678,717 B1 1/2004 Schneider
6,691,105 B1 2/2004 Virdy
6,711,585 B1 3/2004 Copperman et al.
6,718,321 B2 4/2004 Birrell et al.
6,735,585 B1 5/2004 Black et al.
6,745,367 B1 6/2004 Bates et al.
6,748,375 B1 6/2004 Wong et al.
6,751,562 B1 6/2004 Blackett et al.
6,751,606 B1 6/2004 Fries et al.
6,760,746 B1 7/2004 Schneider
6,760,770 B1 7/2004 Kageyama
6,766,369 B1 7/2004 Haitsuka et al.
6,779,178 B1 8/2004 Lloyd et al.
6,799,201 B1 9/2004 Lee et al.
6,836,805 B1 12/2004 Cook
6,850,940 B2 2/2005 Wesinger, Jr. et al.
6,880,007 B1 4/2005 Gardos et al.
6,892,226 B1 5/2005 Tso et al.
6,895,402 B1 5/2005 Emens et al.
6,895,430 B1 5/2005 Schneider
6,901,436 B1 5/2005 Schneider
6,931,451 B1 8/2005 Logan et al.
6,944,658 B1 9/2005 Schneider
6,959,339 B1 10/2005 Wu et al.
6,961,700 B2 11/2005 Mitchell et al.
6,963,928 B1 11/2005 Bagley et al.
6,973,505 B1 12/2005 Schneider
6,981,023 B1 12/2005 Hamilton et al.
6,990,678 B2 1/2006 Zigmond
7,000,028 B1 2/2006 Broadhurst et al.
7,003,442 B1 * 2/2006 Tsuda ..... 707/999.005
7,010,568 B1 3/2006 Schneider et al.
7,013,298 B1 3/2006 De La Huerga
7,039,697 B2 5/2006 Bayles
7,039,708 B1 5/2006 Knobl et al.
7,069,323 B2 6/2006 Gardos et al.
7,080,158 B1 * 7/2006 Squire ..... 709/245
7,089,194 B1 8/2006 Berstis et al.
7,120,236 B1 10/2006 Schneider
7,136,725 B1 11/2006 Paciorek et al.
7,136,932 B1 11/2006 Schneider
7,149,780 B2 12/2006 Quine et al.
7,188,138 B1 3/2007 Schneider
7,194,552 B1 3/2007 Schneider
7,225,249 B1 5/2007 Barry et al.
7,359,987 B2 4/2008 Stahura
7,418,471 B2 8/2008 King et al.
7,472,160 B2 12/2008 King et al.
7,490,124 B2 2/2009 King et al.
7,543,026 B2 6/2009 Quine et al.
7,546,381 B2 6/2009 Tout
7,565,402 B2 7/2009 Schneider
7,606,858 B2 10/2009 King et al.

| | | | | |
|---|---|---|---|---|
| 7,627,628 | B2 | 12/2009 | King et al. | |
| 7,752,260 | B2 | 7/2010 | King et al. | |
| 8,037,168 | B2 | 10/2011 | Schneider | |
| 2001/0010032 | A1 | 7/2001 | Ehlers et al. | |
| 2001/0021947 | A1 | 9/2001 | Kim | |
| 2001/0047429 | A1 | 11/2001 | Seng et al. | |
| 2002/0010795 | A1 | 1/2002 | Brown | |
| 2002/0016174 | A1 | 2/2002 | Gibson et al. | |
| 2002/0023034 | A1 | 2/2002 | Brown et al. | |
| 2002/0059161 | A1 | 5/2002 | Li | |
| 2002/0065903 | A1 | 5/2002 | Fellman | |
| 2002/0069080 | A1 | 6/2002 | Roy et al. | |
| 2002/0069378 | A1 | 6/2002 | McLellan et al. | |
| 2002/0073233 | A1 | 6/2002 | Gross et al. | |
| 2002/0091703 | A1 | 7/2002 | Bayles | |
| 2002/0091827 | A1 | 7/2002 | King et al. | |
| 2002/0091836 | A1 | 7/2002 | Moetteli | |
| 2002/0103745 | A1 | 8/2002 | Lof et al. | |
| 2002/0129013 | A1 | 9/2002 | Thomas | |
| 2002/0024424 | A1 | 10/2002 | Nelson et al. | |
| 2002/0156800 | A1 * | 10/2002 | Ong | 707/203 |
| 2002/0188699 | A1 | 12/2002 | Ullman et al. | |
| 2002/0194113 | A1 | 12/2002 | Lof et al. | |
| 2003/0009592 | A1 | 1/2003 | Stahura | |
| 2003/0014450 | A1 | 1/2003 | Hoffman | |
| 2003/0074672 | A1 | 4/2003 | Daniels | |
| 2003/0088708 | A1 | 5/2003 | Lewallen | |
| 2003/0098375 | A1 | 5/2003 | Shiga et al. | |
| 2003/0225670 | A1 | 12/2003 | DeCarlo, III | |
| 2004/0030759 | A1 | 2/2004 | Hidary et al. | |
| 2004/0044791 | A1 | 3/2004 | Pouzzner | |
| 2004/0088083 | A1 | 5/2004 | Davis et al. | |
| 2004/0107025 | A1 | 6/2004 | Ransom et al. | |
| 2005/0055306 | A1 | 3/2005 | Miller et al. | |
| 2005/0102354 | A1 | 5/2005 | Hollenbeck et al. | |
| 2005/0235031 | A1 | 10/2005 | Schneider | |
| 2006/0190623 | A1 | 8/2006 | Stahura | |
| 2006/0265516 | A1 | 11/2006 | Schilling | |
| 2008/0005342 | A1 | 1/2008 | Schneider | |
| 2008/0010365 | A1 | 1/2008 | Schneider | |
| 2008/0016142 | A1 | 1/2008 | Schneider | |
| 2008/0016233 | A1 | 1/2008 | Schneider | |
| 2008/0059607 | A1 | 3/2008 | Schneider | |
| 2008/0235383 | A1 | 9/2008 | Schneider | |

FOREIGN PATENT DOCUMENTS

| | | |
|---|---|---|
| JP | 11085492 | 3/1999 |
| JP | 11184667 | 7/1999 |
| JP | 11242682 | 9/1999 |
| JP | 11296428 | 10/1999 |
| WO | 9909726 | 2/1999 |
| WO | 9922488 | 5/1999 |
| WO | 9939275 | 8/1999 |
| WO | 0007133 | 2/2000 |

OTHER PUBLICATIONS

NTIA-DOC, Improvement of Technical Management of Internet Names and Addresses, Federal Register V63 N34, Feb. 20, 1998, from http:--www.ntia.doc.gov-ntiahome-domainname-022098fedreg.htm.

NTIA-DOC, RFC on the enhancement of the .us Domain Space, Aug. 8, 1998, from http:--www.ntia.doc.gov-ntiahome-domainname-usrfc-dotusrfc.htm.

Norman, J.; Southern Telecom and Main.net Announce Successful Demonstration of Broadband over Power Lines; Southern Telecom; Dec. 2003; p. 1.

Motegi, N., Piette, Ma.; Web-based Energy Information Systems for Large Commercial Buildings; Ernest Orlando Lawrence Berkely National Laboratory; May 2002; USA; p. 3, paragraphs 1, 2, 4, Figure 1; p. 4, paragraphs 1, 2, 3, 4; p. 7, paragraphs 2, 3, 4, Table 1; 10, paragraph 2; p. 11, paragraph 1, Table 5.

Oakes, C., Internet Keywords Patent Spat, Wired News, Jul. 22, 1999 from http:--www.wired.com-news-technology-0,1282,13892.00html.

Perez, Juan Carlos, Mozilla Launches Firefox 1.0, PCWORLD.com, Nov. 9, 2004 <http:--www.pcworld.com-news-article-0,aid,118537,00.asp>.

Advanced Control Systems, Inc.; Load Management; Advanced Control Systems, Inc.; Jun. 20, 2001 (Aug. 1999); USA; p. 1, paragraph 1; p. 2, paragraphs 1, 2, 3; p. 3, paragraphs 1 & 2; p. 4, paragraphs 1 & 2.

American City Business Journal, Inc.; Blackout early warnings mandated; Apr. 3, 2001; USA; paragraphs 1, 2, 5, 6.

Bradley, J.; ISO Blackout Notice Plan Follow-Up; Silicon Valley Manufacturers Group & California Independent System Operator (CAISO); May 8, 2001; p. 1, paragraphs 1, 2, 3, 4; p. 2, paragraphs 1, 3, 4.

California, State of; Energy Action Plan; May 20, 2003; USA; p. 5, Section 1; pp. 7 & 8 Section V.

California Independent System Operator; California Independent System Operator Participant's whom have entered into an Interruptible Service Contract or similar agreement; California Independent System Operator (CAISO); Dec. 10, 2002; p. 1.

Desmond, J.; Customer Centric Alert and Resposne Program Overview; California Independent System Operator (CAISO); May 24, 2001; USA; pp. 2, 3, 4, 5, 6, 12, 13, 17, 18.

Goldman, C.A.; Kintner-Meyer, M.; Heffner, G.; Do "Enabling Technologies" Affect Customer Performance in Price-Responsive Load Programs?; LBNL-50328; Ernest Orlando Lawrence Berkeley National Laboratory; http:--eetd.lbl.gov-EA-EMP-; Aug. 2002; p. 3, paragraph 2; p. 4, paragraph 2; p. 6, paragraph 3; p. 7, paragraphs 1 & 2, Table 2; p. 8, paragraphs 1, 2, 3, Table 3; p. 9, paragraphs 1, 2, 3, Table 4; p. 10, paragraphs 1, 2, 3; p. 11, paragraph 1, Table 5; p. 12, paragraphs 1 & 2, Figure 2; p. 15, paragraphs 2, 3, 4; p. 16, paragraph 2.

Graves, K.; CAISO Summer 2001 Assessment; California Independent System Operator (CAISO); Mar. 22, 2001; USA; p. 29, paragraphs 1 & 2, p. 30, paragraphs 1, 2, Figure III-E.

Graves, K.; CAISO Feb. 2001 Winter Assessment and Summer 2001 Post-season Summary; California Independent System Operator (CAISO); Oct. 8, 2001; USA; pp. 17 & 18, Section IV.

Gross, G.; FCC moves ahead with powerline broadband rules; IDG News Service; Feb. 13, 2004; USA; paragraphs 1, 2, 6, 9.

Guardino; Board of Governors; Notification Plan 2; California Independent System Operator (CAISO); May 21, 2001; USA.

Helman, C., For years electric companies have dreamed of making their wires the high-speed data pipe to your PC. One tech company may yet make the dream possible.; Forbes.com; Jan. 20, 2003; USA; paragraphs 1, 2, 3, 4, 5.

Jonker, R.; Dijak, P.; Enabling Distributed Generation and Demand Response with Enterprise Energy-Management Systems; Darnell.com Inc.; May 17, 2001; USA; p. 1, paragraphs 1 & 2; p. 2, paragarphs 1, 2, 3, 4, 5, 6, 7, 8; p. 5, paragraphs 2, 3, 4, 5, 6; p. 7, paragraphs 4, 6, 7, 8, 9; p. 8, paragraphs 2, 3, 4; p. 9; p. 10.

Keoni, A.; California Independent System Operator Load Program Participants; California Independent System Operator (CAISO); Apr. 8, 2002; pp. 1, 2, 3.

Keoni, A.; Implementation Plan and Required Information for the Partipating Load Program (PLP); California Independent System Operator (CAISO); Aug. 8, 2002; USA; p. 1, paragraphs 2 & 3; p. 2, paragraphs 1 & 2, Table 1.

Labaton, S., F.C.C. Begins Rewriting Rules on Delivery of the Internet; Associated Press; Feb. 13, 2004; USA; paragarphs 1, 2, 6, 7.

Lyon, D.; The Development of Electric System Emergencies and the Emergency Response Communication Network: White Paper; California Independent System Operator (CAISO); Jun. 20, 2001; USA; p. 2, paragraphs 1 & 4; p. 3, paragraph 1 & Section II; pp. 6, 7, 8, 9; p. 10, Section III, paragraphs 1, 2, 3; p. 11, paragraphs 2 & 3; p. 12, paragraph 1; p. 13, paragraph 4, p. 14.

Wired News Report, The Postal Proposal, Wired News, May 8, 1999 from http:--www.wired.com-news-technology-0,1282.131-30,00.html.

Wired News Report, Depp Space Web?, Wired News, Jul. 22, 1999 from http:--www.wired.com-news-technology-0,1282,139-09,00.html.

Oesterreichishe Gesellshaft Fur Unwelt Und Technik; iea-experts group on r&d priority setting and evaluation liberalisation of the electricity market; http:--www.oegut.at; Mar. 18, 2002; Austria (in English); pp. 4 (Sections 3 & 4), 7 Section 3), 8 (Controllable "Dispatchable" Loads; Section 2), 9 (Distributed Energy Resources).

O'Neil, E.; Cumulative Totals of No-Touch, Restricted Maintenance Operations, Alert, Warning, Emergency and Power Watch Notices Issued from 1998 to Present; California Independent System Operator (CAISO); May 29, 2003; USA; p. 4, Table; p. 5, Table; p. 6, Table; p. 7, Table; p. 8, Table; p. 9, Table; p. 10, Table; p. 11, Table; p. 11, Table; p. 12, Table; p. 14, Table.
Perez, Pena, R.; Utility Could Have Halted '03 Blackout, Panel Says; New York Times; http:--www.nytimes.com-2004-0406-national-06BLAC.html; Apr. 6, 2004; USA; paragraphs 1, 2, 3, 4, 9.
Purdum, T.; Statewide Blackouts Ordered as Heat Strains California Grid; New York Times; May 8, 2001; USA; paragraphs 3, 4, 5, 8, 9.
United States of America, Federal Energy Regulation Commission; National Transmission Grid Study, Consolidated List of Recommendations; FERC; May 6, 2002, USA; pp. 2-76 & 3-77 Section 4, 5-79 Section 5.
Weiss, J.; EPRI's Enterprise Infrastructure EPRI's Enterprise Infrastructure Security (EIS) Program Security (EIS) Program; Jul. 7, 2000; USA; pp. 2 through 24.
Weller, G.H.; A Case Study Review of Technical and Technology Issues for Transition of a Utility Load Management Program to Provide System Reliability Resources in Restructured Electricity Markets; LBNL-52408; Ernest Orlando Lawrence Berkeley National Laboratory; http:--certs.lbl.gov-; Jul. 2001; USA; pp. 1 & 2, Section 1; pp. 3 & 4, Section 2; pp. 6-13, Sections 3.1-3.1.8; pp. 16-17, Section 3.3, Table 3.1; pp. 18-40, Section 4; pp. 41-42, Section 5; Appendix A.
Werst, K.L., Why Rotating Outages?; California Independent System Operator (CAISO); Aug. 17, 2001; USA; paragraphs 1, 2, 3, 5, 6, 7.
Donaghy, Melanie, "Wines & Vines," Sep. 1997, vol. 78, No. 9, p. 39(6).
Fax-Phone Switch for Multi-Ring Telephone Lines; Derwent Abstract; Jul. 1992.
"What does your phone number spell?" Internet print-out of www.phonespell.com; Wayback Machine.
"What Words are Hiding in Your Phone Number?" Internet print-out of www.dialabc.com; Wayback Machine.
Courter, Gini; Microsoft Office 2000 Professional Edition, 1999, Sybex, pp. 92-96, 254-257.
www.phonetic.com; Internet print-out; Wayback Machine.
Berners, T. et al., Network Working Group, Uniform Resource Identifiers (URI): General Syntax, Aug. 1988.
Web Page of Network Solutions.
Oakes, Chris, "Net Sol, ICANN Reach Accord," Wired News, from wired.com-news-politics-0,1283,31557,00.html, Sep. 29, 1999, pp. 1-3.
Singhal, Vigyan and Smith, Alan Jay, "Analysis of locking behavior in three real database systems," 1997, the VLDB Journal, vol. 6, pp. 40-52.
Hollenbeck et al., "Domain Name System Wildcards in Top-Level Domain Zones", VeriSign Naming and Directory Services, VeriSign, Inc., Sep. 9, 2003.
Ohta, "Incremental Zone Transfer in DNS", RFC 1995, Aug. 1996.
Vixie et al., "Dynamic Updates in the Domain Name System (DNS Update)", RFC 2136, Apr. 1997.
Mockapetris, "Domain Names-Concepts and Facilities", RFC 1034, Nov. 1987.
Berners, Lee T.; "RFC 1630: Universal Resource Identifiers in WWW-A Unifying Syntax for the Expression of Names and Addresses of Objects on the Network as used in the World Wide Web", IETF, Jun. 1994; http:--www.faqs.org-rfcs-rfc1630.html.
Mockapetris P., "RFC 1035: Domain Names-Implementation and Specification", IETF, Nov. 1987, http:--www.faqs.org-rfcs-rfc1035.html.
Harrenstien, et al.; "RFC 954: Nicname-Whois", IETF, Oct. 1985, http:--ww.faqs.org-rfcs-rfc954.html.
Mockapetris, Request for Comment (RFC) 1034, Domain Names-Concepts and Facilities, Section 4.3.3, IETF, Nov. 1987, pp. 1-55.
Request for Comment (RFC) 1480, The US Domain; Cooper & Postel, Jun. 1993, pp. 1-47.
Request for Comment (RFC) 2276, Architecture Principles of Uniform Resource Name Resolution, Sollins, Jan. 1998; pp. 1-24.
Samson, M., *PGMedia, Inc. d-b-a Name.Space TM,* v. *Network Solutions, Inc., et al.,* Jun. 1999, pp. 1-2.
Liberto, S.M., Domain Name Conflicts: Hey! That's My.Com!, WWWiz Magazine, Mar. 1998, pp. 1-3.
Cabell, D., Learning Cyberlaw in Cyberspace, Name Conflicts, Berkman Center for Internet & Society, Harvard Law Schol, Aug. 1999, pp. 1-21.
Goodin, D., CNET News.com: NSI domain slowdown persists, Jan. 1999, pp. 1-4.
Goodin, D., CNET News.com: NSI confirms database revisions, Jan. 21, 1999, pp. 1-2.
Northrup, T., Windows IT Library: Domain Name Services, Jul. 1998, pp. 1-41.
Berners-Lee et al., Network Working Group, Uniform Resource Identifiers (URI): General Syntax, Xerox Corporation, http:--www.ietf.org-rfc-rfc2396.txt Aug. 1998.
Press Release, "OINGO Pioneers New Domain Name Variation Technology", May 17, 2000; http:--www.namingsolutions.com-ns_new_pr_51700.hmtl.
Statement of the policy oversign committee, The Economic Structure of Internet Generic Top-Level Domain Name Registries Analysis and Recommendations, Jul. 23, 1998.
Network Solutions and Leading Launch Premier Domain Registration Service Program, Mar. 1997.
Network Solutions and VeriSign Launch Combined Internet Name and Certification Registration, Internet World. Mar. 10, 1997.
Network Solutions, Inc., Online Team up to Server Internet Needs of Small Business Owners, Jan. 1998, pp. 1-2.
Schmid, E., McCorkle, S., O'Neil, E.; ISO Electric Emergency Notification: Memorandum; California Independent System Operator (CAISO); May 17, 2001; USA; p. 1, paragraphs 1 & 4; p. 2, paragraphs 1, 2, 3; p. 3; p. 4, paragraph 4 & 5; p. 5; p. 6, paragraph 1, p. 7; p. 8.

* cited by examiner

SEARCH ENGINE REQUEST METHOD, PRODUCT, AND APPARATUS

Matter enclosed in heavy brackets [ ] appears in the original patent but forms no part of this reissue specification; matter printed in italics indicates the additions made by reissue.

OTHER APPLICATIONS

This application [claims the benefit of the following patent applications, which are hereby incorporated] *incorporates the following applications* by reference:

[1.] *this application is a continuation-in-part of* U.S. patent application Ser. No. 09/532,500 filed Mar. 21, 2000, by Schneider, entitled "Fictitious domain name method, product, and apparatus", [which claims the benefit of] *now U.S. Pat. No. 7,136,932; this application is also a continuation-in-part of* U.S. patent application Ser. No. 09/525,350 filed Mar. 15, 2000, by Schneider, entitled "Method for integrating domain name registration with domain name resolution"[and], *now U.S. Pat. No. 6,338,082; this application also* claims the benefit of U.S. Provisional Application Ser. No. 60/143,859 filed Jul. 15, 1999, by Schneider entitled "Method and apparatus for generation, registration, resolution, and emulation of name space", now abandoned[.]; *this application also claims the benefit of* U.S. Provisional Application Ser. No. 60/135,751 filed May 25, 1999, by Schneider entitled "Method and system for name space resolution", now abandoned [and]; *this application also claims the benefit of* U.S. Provisional Application Ser. No. 60/125,531 filed Mar. 22, 1999, by Schneider entitled "Method and system for the emulation of name space", now abandoned[.];

[2.] *this application also claims the benefit of* U.S. Provisional Application Ser. No. 60/153,594 filed Sep. 13, 1999, by Schneider entitled "Method and apparatus for using a portion of a URI to select and display advertising[.]";

[3.] *this application also claims the benefit of* U.S. Provisional Application Ser. No. 60/152,015 filed Sep. 1, 1999, by Schneider, et al., entitled "Method and apparatus for using a portion of a URI as a search request."

FIELD OF THE INVENTION

This invention generally relates to search requests, and more specifically relates to a method and apparatus for using a non-query URI component as a search request.

BACKGROUND OF THE INVENTION

The Internet is a vast computer network consisting of many smaller networks that span the world. A network provides a distributed communicating system of computers that are interconnected by various electronic communication links and computer software protocols. Because of the Internet's distributed and open network architecture, it is possible to transfer data from one computer to any other computer worldwide. In 1991, the World-Wide-Web (WWW or Web) revolutionized the way information is managed and distributed.

The Web is based on the concept of hypertext and a transfer method known as Hypertext Transfer Protocol (HTTP) which is designed to run primarily over a Transmission Control Protocol/Internet Protocol (TCP/IP) connection that employs a standard Internet setup. A server-computer may issue the data and a client computer displays or processes it. TCP may then convert messages into streams of packets at the source, then reassemble them back into messages at the destination. Internet Protocol (IP) handles addressing, seeing to it that packets are routed across multiple nodes and even across multiple networks with multiple standards. HTTP protocol permits client systems connected to the Internet to access independent and geographically scattered server systems also connected to the Internet.

Client side browsers, such as Netscape Navigator and/or Microsoft Internet Explorer (MSIE) provide graphical user interface (GUI) based client applications that implement the client side portion of the HTTP protocol. One format for information transfer is to create documents using Hypertext Markup Language (HTML). HTML pages are made up of standard text as well as formatting codes that indicate how the page should be displayed. The client side browser reads these codes in order to display the page. A web page may be static and requires no variables to display information or link to other predetermined web pages. A web page is dynamic when arguments are passed which are either hidden in the web page or entered from a client browser to supply the necessary inputs displayed on the web page. Common Gateway Interface (CGI) is a standard for running external programs from a web server. CGI specifies how to pass arguments to the executing program as part of the HTTP server request. Commonly, a CGI script may take the name and value arguments from an input form of a first web page which may be used as a query to access a database server and generate an HTML web page with customized data results as output that is passed back to the client browser for display.

The Web is a means of accessing information on the Internet that allows a user to "surf the web" and navigate the Internet resources intuitively, without technical knowledge. The Web dispenses with command-line utilities, which typically require a user to transmit sets of commands to communicate with an Internet server. Instead, the Web is made up of millions of interconnected web pages, or documents, which may be displayed on a computer monitor. Hosts running special servers provide the Web pages. Software that runs these Web servers is relatively simple and is available on a wide range of computer platforms including PC's.

A Uniform Resource Identifier (URI) is a compact string of characters for identifying an abstract or physical resource. URIs, is the generic set of all names and addresses that refer to objects on the Internet. URLs that refer to objects accessed with existing protocols are known as URLs. A URL is the address of a file accessible on the Internet. The URL contains the name of the protocol required to access the resource, a domain name, Fully Qualified Domain Name (FQDN), or IP address that identifies a specific computer on the Internet, and a hierarchical description of a file location on the computer. In addition, the last (optional) part of the URL may be a "?" followed by a query string having name/value pairs for parameters (e.g. "?size=small&quantity=3") or a "#" followed by a fragment identifier indicating a particular position within the specified document.

The URI "http://www.example.com:80/index.html#appendix" is the concatenation of several components where "http:" is the scheme or protocol, "//www.example.com" is the FQDN having "www" as the host of the domain name "example.com", ":80" is the port connection for the HTTP server request, "index.html" is the filename located on the server, "#appendix" is the identifier to display a fragment of the HTML file called "index". The URL "http://www.example.com" also retrieves an HTML file called "index" on a HTTP server called "example.com". By default, when either a port or filename is omitted upon accessing a HTTP server via a URL, the client browser interprets the request by connecting via port 80, and retrieving the HTML file called "index".

A domain name consists of two parts: a host and a domain. Technically, the letters to the right of the "dot" (e.g., tut.net) are referred to as Top Level Domains (TLDs), while hosts, computers with assigned IP addresses that are listed in specific TLD registries are known as second-level domains (SLDs). For the domain name "tut.net", ".net" is the TLD, and "tut" is the SLD. Domain name space is the ordered hierarchical set of all possible domain names either in use or to be used for locating an IP address on the Internet. TLDs are known as top-level domains because they comprise the highest-order name space available on the Internet. Second-level domains, as well as third-level domains (3LDs) such as "king.tut.net", are subsidiary to TLDs in the hierarchy of the Internet's DNS.

The main use of a web browser location field is for locating URLs to access resources. Entering a URL in the location field of a web browser serves as a means to access that URL. Because the function of the location field is so critical for accessing resources, the design of such location fields have rivaled much competition and innovation between existing web browser products. Improvements to better track and organize sites of URLs that users have visited such as Bookmark folders, URL history, and the personal toolbar are all examples of functionality designed to help users navigate.

A more recent feature called Smart Browsing is integrated into Netscape Navigator that uses Internet Keywords so users can streamline the use of URLs and get fast access to web sites using the browser's location field. Any single or multiword strings typed into the browser's location field that does not include a "." are sent via HTTP to a server at "netscape.com". The keyword server pulls the string and compares it to several separate lists of keyword-URL pairs. If the keyword system finds a match, it redirects the user's browser to the URL of the keyword-URL pair. Failing a match against the lists, the user's browser is redirected to a Netscape Search page with the typed string as the search query.

U.S. Provisional Application Ser. No. 60/143,859 filed Jul. 15, 1999, by Schneider entitled "Method and apparatus for generation, registration, resolution, and emulation of name space", now abandoned, uses a domain name having a top level domain alias (TLDA) to simultaneously access and search a given resource demonstrating the combination of both resolution and search services. For instance, when input is received and processed such as "http://example.44106", steps are performed to determine that "0.44106" is not a resolvable TLD and may be processed instead as a search term. Steps may then be performed to translate input into a valid URI such as "http://example.com/weather.cgi?zip=44106". When the URI is accessed, a CGI script called "weather" is executed passing the value "44106" for the name "zip", which in this case represents a zip code. By so doing a fictitious name is used to simultaneously access both a resource and search request.

This clearly demonstrates the need for methods of encouraging the creative use of URIs to access resources. Accordingly, in light of the above, there is a strong need in the art for a system and method to improve how resources and content may be accessed.

SUMMARY OF THE INVENTION

Briefly, the present invention allows URI components to be used as a search term in a query or search request. The invention allows for the non-query portion of a first URI to be used in the query portion of a second URI to generate dynamic content. The present invention allows for a shorter URI to be created on the fly in real-time that accesses content of a longer URI. The invention allows the user to combine Boolean logic with valid URI notation to generate a search request from the URI or vice-versa.

In general, in accordance with the present invention a method for locating a network resource from a first identifier includes the steps of determining whether the first identifier is accessible, accessing the first identifier in response to determining that the first identifier is accessible, generating a second identifier in response to determining that the first identifier is not accessible, wherein said second identifier is generated by retrieving information from one of a user modifiable configuration settings, template, GO LIST, name translation table, and registry, and accessing said second identifier in response to generating said second identifier.

In accordance with another aspect of the present invention a method for locating a network resource from a first identifier having a valid accessible first URI includes the steps of parsing at least one non-query URI component from the first URI, generating a valid accessible second URI having a query component that corresponds to the first URI, and simultaneously accessing both the first URI and said second URI.

In accordance with yet another aspect of the present invention a method for locating a network resource from a first identifier having a valid first URI includes the steps of determining whether the first URI is accessible, accessing the first URI in response to determining that the first URI is accessible, parsing at least one non-query URI component from the first URI in response to determining that the first URI is not accessible, generating a valid second URI having a query component that corresponds to the first URI, and accessing said second URI.

In accordance with yet additional aspects of the present invention, an apparatus which implements substantially the same functionality in substantially the same manner as the methods described above is provided.

In accordance with other additional aspects of the present invention, a computer-readable medium that includes computer-executable instructions may be used to perform substantially the same methods as those described above is provided.

The foregoing and other features of the invention are hereinafter fully described and particularly pointed out in the claims. The following description and the annexed drawings set forth in detail one or more illustrative aspects of the invention, such being indicative, however, of but one or a few of the various ways in which the principles of the invention may be employed.

DETAILED DESCRIPTION OF THE INVENTION

Figure 1A:
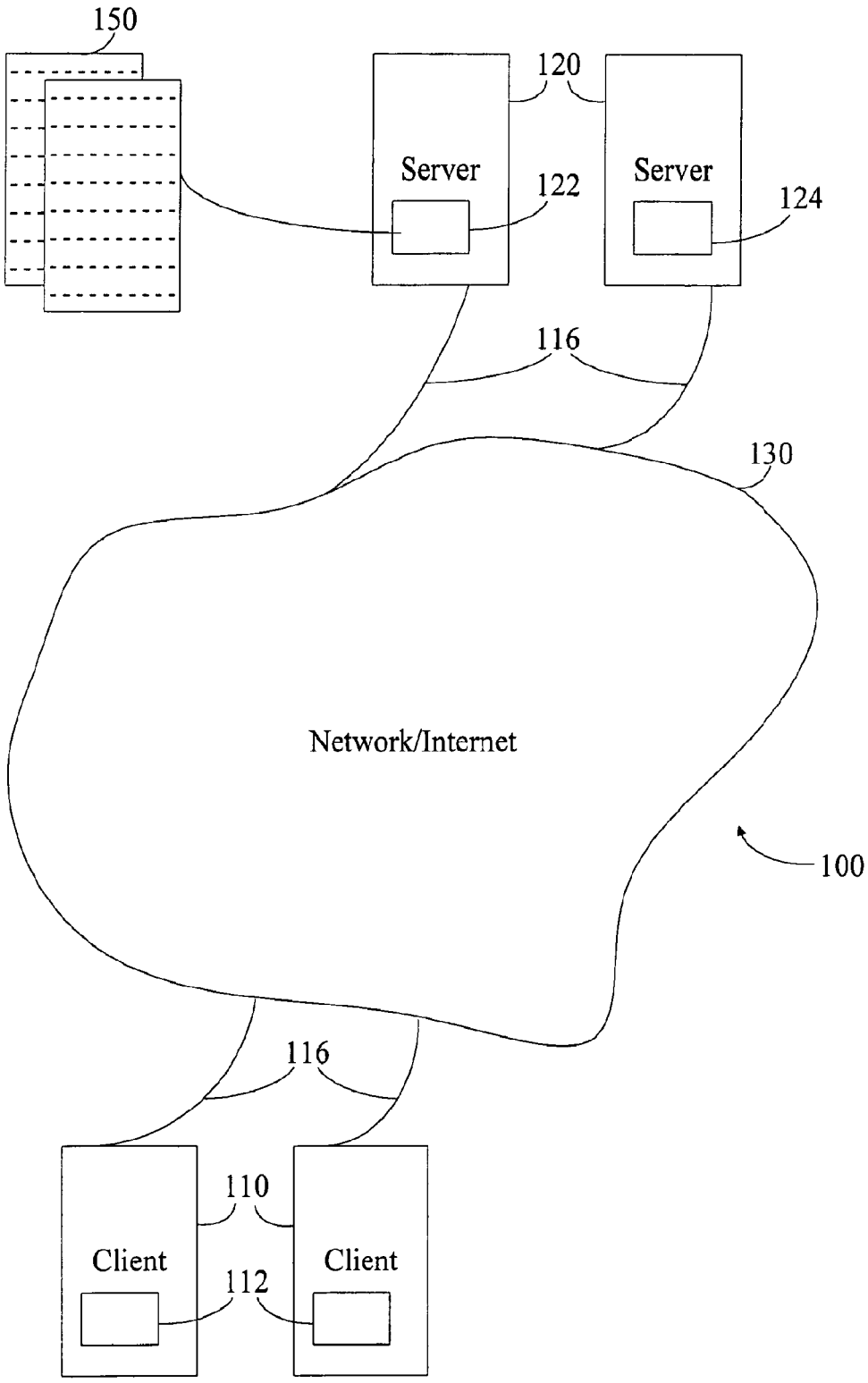
FIG. 1a is a block diagram of an exemplary distributed computer system in accordance with the present invention.

The present invention will now be described with reference to the drawings, wherein like reference numerals are used to refer to like elements throughout.

Turning first to the nomenclature of the specification, the detailed description that follows represents processes and symbolic representations of operations by conventional computer components, including a local processing unit, memory storage devices for the local processing unit, display devices, and input devices. Furthermore, these processes and operations may utilize conventional computer components in a heterogeneous distributed computing environment, including remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements.

A process may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering, etc., which are often associated with manual operations performed by a human operator. The operations described herein are machine operations performed in conjunction with various input provided by a human operator or user that interacts with the computer. The machines used for performing the operation of the present invention include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

FIG. 1a illustrates an exemplary system for providing a distributed computer system 100 in accordance with one aspect of the present invention and may include client computers or any network access apparatus 110 connected to server computers 120 via a network 130. The network 130 may use Internet communications protocols (IP) to allow clients 110 to communicate with servers 120. The network access apparatus 110 may include a modem or like transceiver to communicate with the electronic network 130. The modem may communicate with the electronic network 130 via a line 116 such as a telephone line, an ISDN line, a coaxial line, a cable television line, a fiber optic line, or a computer network line. Alternatively, the modem may wirelessly communicate with the electronic network 130. The electronic network 130 may provide an on-line service, an Internet service provider, a local area network service, a wide area network service, a cable television service, a wireless data service, an intranet, a satellite service, or the like.

The client computers 110 may be any network access apparatus including hand held devices, palmtop computers, personal digital assistants (PDAs), notebook, laptop, portable computers, desktop PCs, workstations, and/or larger/smaller computer systems. It is noted that the network access apparatus 110 may have a variety of forms, including but not limited to, a general purpose computer, a network computer, an internet television, a set top box, a web-enabled telephone, an internet appliance, a portable wireless device, a game player, a video recorder, and/or an audio component, for example.

Each client 110 typically includes one or more processors 166, memories 168, and input/output devices 170. An input device may be any suitable device for the user to give input to client computer system 110, for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, and/or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they may be combined; for example: a display with an integrated touchscreen, a display with an integrated keyboard, or a speech-recognition unit combined with a text-to-speech converter.

The servers 120 may be similarly configured. However, in many instances server sites 120 include many computers, perhaps connected by a separate private network. In fact, the network 130 may include hundreds of thousands of individual networks of computers. Although client computers 110 are shown separate from the server computers 120, it is understood that a single computer might perform the client and server roles. Those skilled in the art will appreciate that the computer environment 100 shown in FIG. 1a is intended to be merely illustrative. The present invention may also be practiced in other computing environments. For example, the present invention may be practiced in multiple processor environments wherein the client computer includes multiple processors. Moreover, the client computer need not include all of the input/output devices as discussed above and may also include additional devices. Those skilled in the art will appreciate that the present invention may also be practiced via Intranets and more generally in distributed environments in which a client computer requests resources from a server computer.

During operation of the distributed system 100, users of the clients 110 may desire to access information records 122 stored by the servers 120 while utilizing, for example, the Web. Furthermore, such server systems 120 may also include one or more search engines having one or more databases 124. The records of information 122 may be in the form of Web pages 150. The pages 150 may be data records including as content plain textual information, or more complex digitally encoded multimedia content, such as software programs, graphics, audio signals, videos, and so forth. It should be understood that although this description focuses on locating information on the World-Wide-Web, the system may also be used for locating information via other wide or local area networks (WANs and LANs), or information stored in a single computer using other communications protocols.

The clients 110 may execute Web browser programs 112, such as Netscape Navigator or MSIE to locate the pages or records 150. The browser programs 112 enable users to enter addresses of specific Web pages 150 to be retrieved. Typically, the address of a Web page is specified as a URI or more specifically as a URL. In addition, when a page has been retrieved, the browser programs 112 may provide access to other pages or records by "clicking" on hyperlinks (or links) to previously retrieved Web pages. Such links may provide an automated way to enter the URL of another page, and to retrieve that page.

Figure 1B:
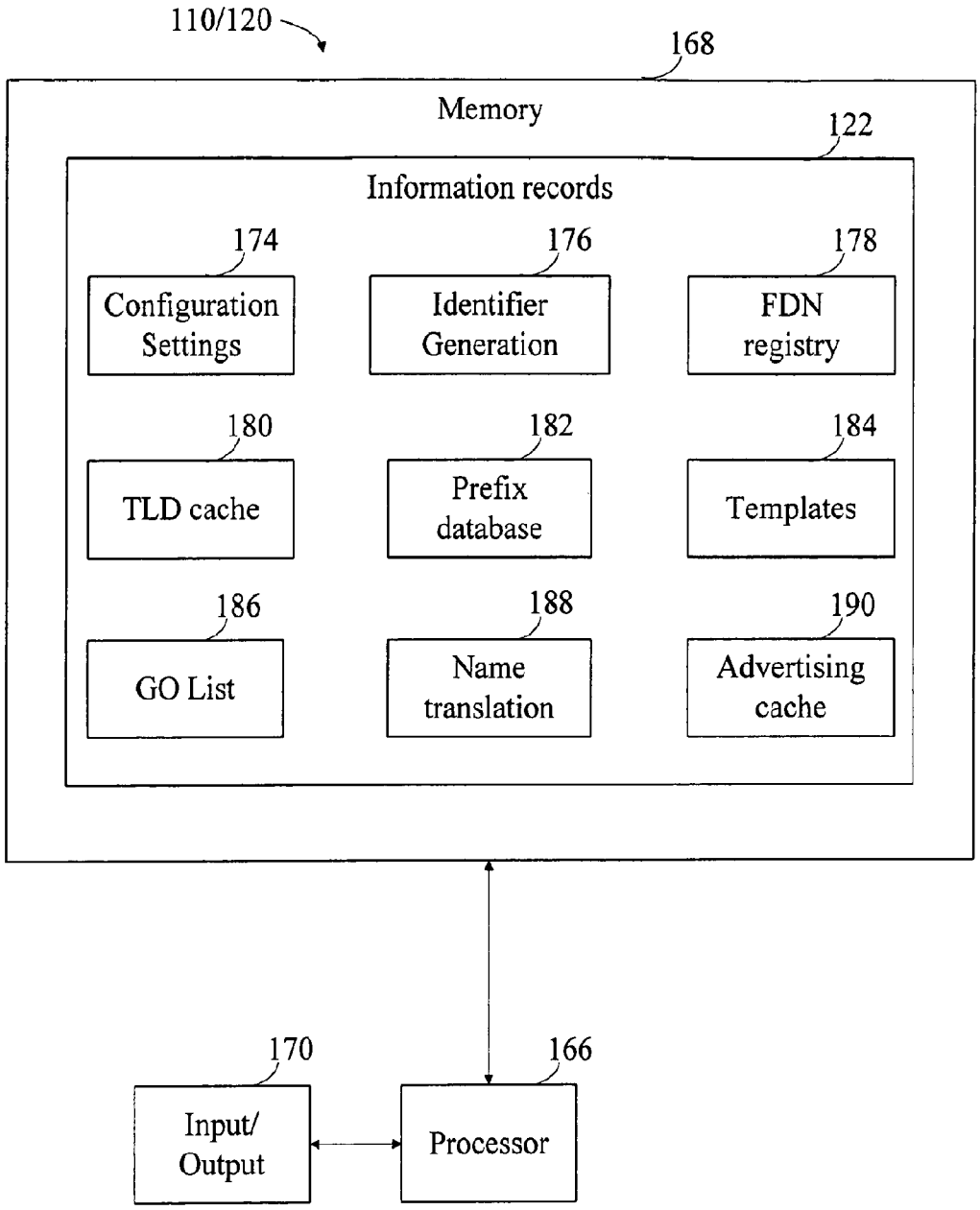
FIG. 1b is a block diagram illustrating exemplary information records stored in memory in accordance with the present invention.

FIG. 1b illustrates a block diagram of a processor 166 coupled to a storage device such as memory 168 and to input/output devices 170 in a client 110 and/or server 120 computing system. Stored in memory 168 may be information records 122 having any combination of exemplary content such as lists, files, and databases. Such records may include for example: user modifiable configuration settings 174, identifier generation routines 176, FDN registry 178, TLD cache 180, prefix database 182, Templates 184, GO List 186, name translation table 188, and advertising cache 190. These information records may be further introduced and discussed in more detail throughout the disclosure of this invention.

Figure 2:
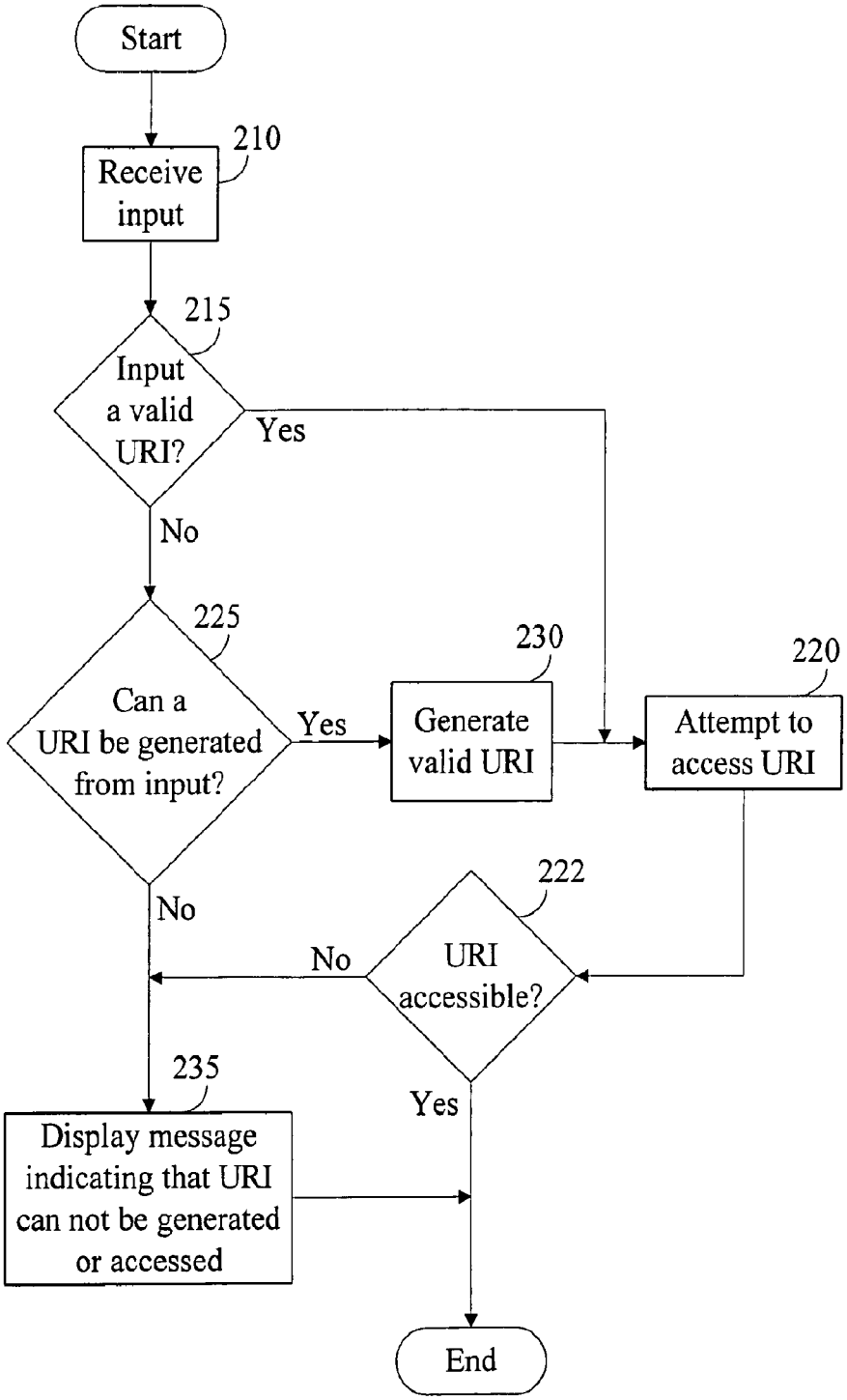
Prior Art Fig. 2
FIG. 2 is a flowchart illustrating the steps performed by a prior art system for accessing a URI.

FIG. 2 is a flowchart illustrating the steps performed by a prior art system for locating a network resource from an identifier by accessing a URI. A device such as a network access apparatus 110, servlet, applet, stand-alone executable program, or user interface element such as a text box object, command line, speech to text interface, location field 814 of a web browser 112, may receive and parse input such as text or voice in step 210. It then may be determined in step 215 whether the input 210 is a URI. If the input is a URI, then an attempt may be made in step 220 to access the URI. The URI may be accessed when it is determined in step 222 that the URI is accessible. If the input is not a URI, then it may be determined in step 225 whether a URI can be generated from the input (e.g., if a scheme is missing the prefix "http://" or another scheme prefix may be concatenated to input). If so, then a URI is generated 230 and an attempt may be made in step 220 to access the URI. If the URI can not be generated or accessed, then a message indicating that the URI can not be generated or accessed may be displayed in step 235.

Figure 3:
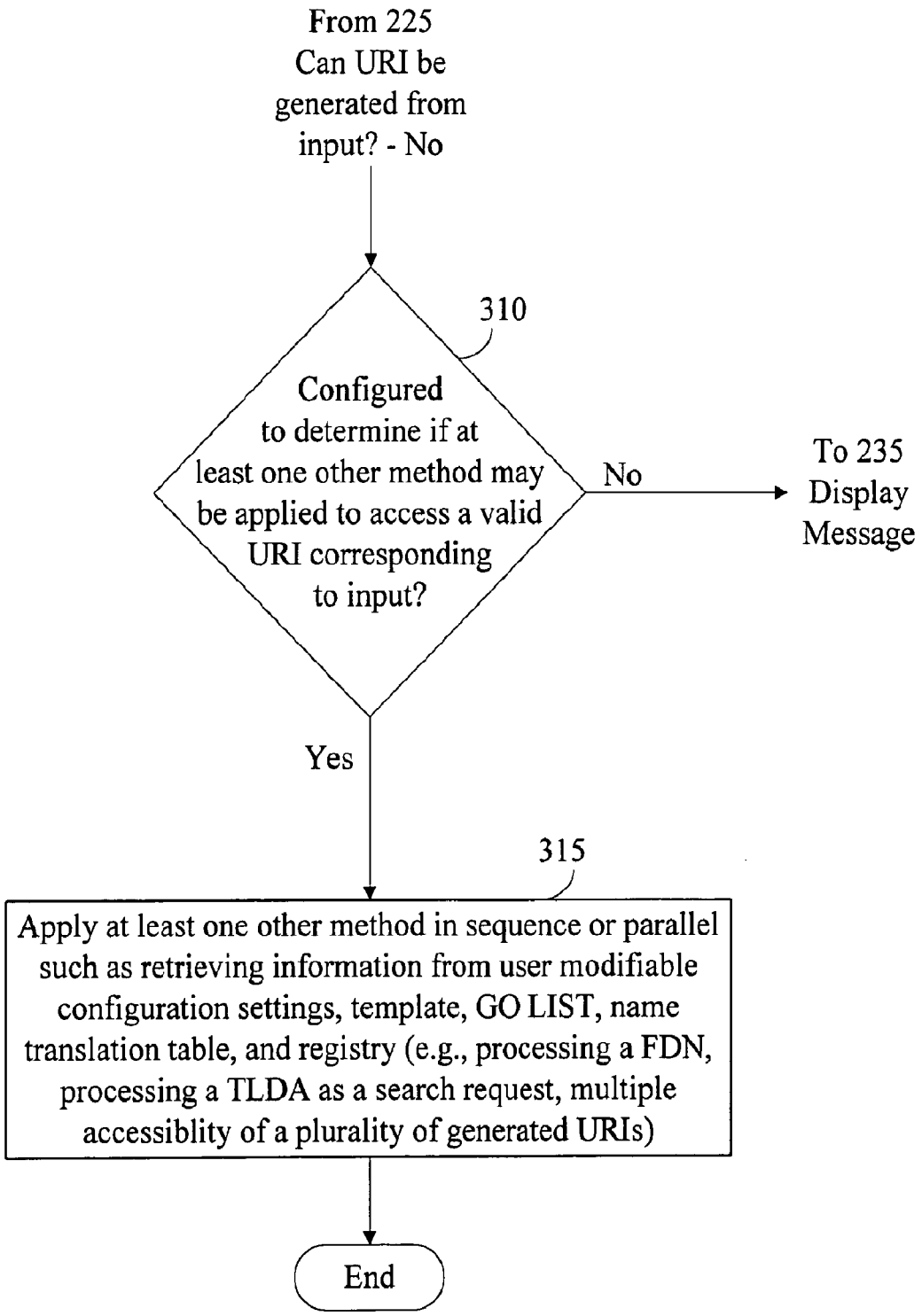
FIG. 3 is a flowchart illustrating the steps performed for generating a valid URI in accordance with the present invention.

FIG. 3 is a flowchart illustrating the steps performed for generating a valid URI. When it is determined in step 225 that a URI can not be generated from the input 210 in accordance with methods known to one of ordinary skill in the art, then it may be determined in step 310 whether it is configured to determine whether other methods may be applied to access a valid URI corresponding to input. If configuration 174 is not enabled, then a message indicating that the URI can not be generated may be displayed in step 235. However, when configuration is enabled, then at least one other method may be applied in step 315 in sequence or parallel including methods explained in U.S. patent application Ser. No. 09/532,500 filed Mar. 21, 2000, by Schneider, entitled "Fictitious domain name method, product, and apparatus" such as retrieving information from user modifiable configuration settings 174, template 184, GO LIST 186, name translation table 188, and registry 178 (e.g., processing a FDN, processing a TLDA as a search request, and multiple accessibility from a plurality of generated URIs, etc.).

Figure 4:
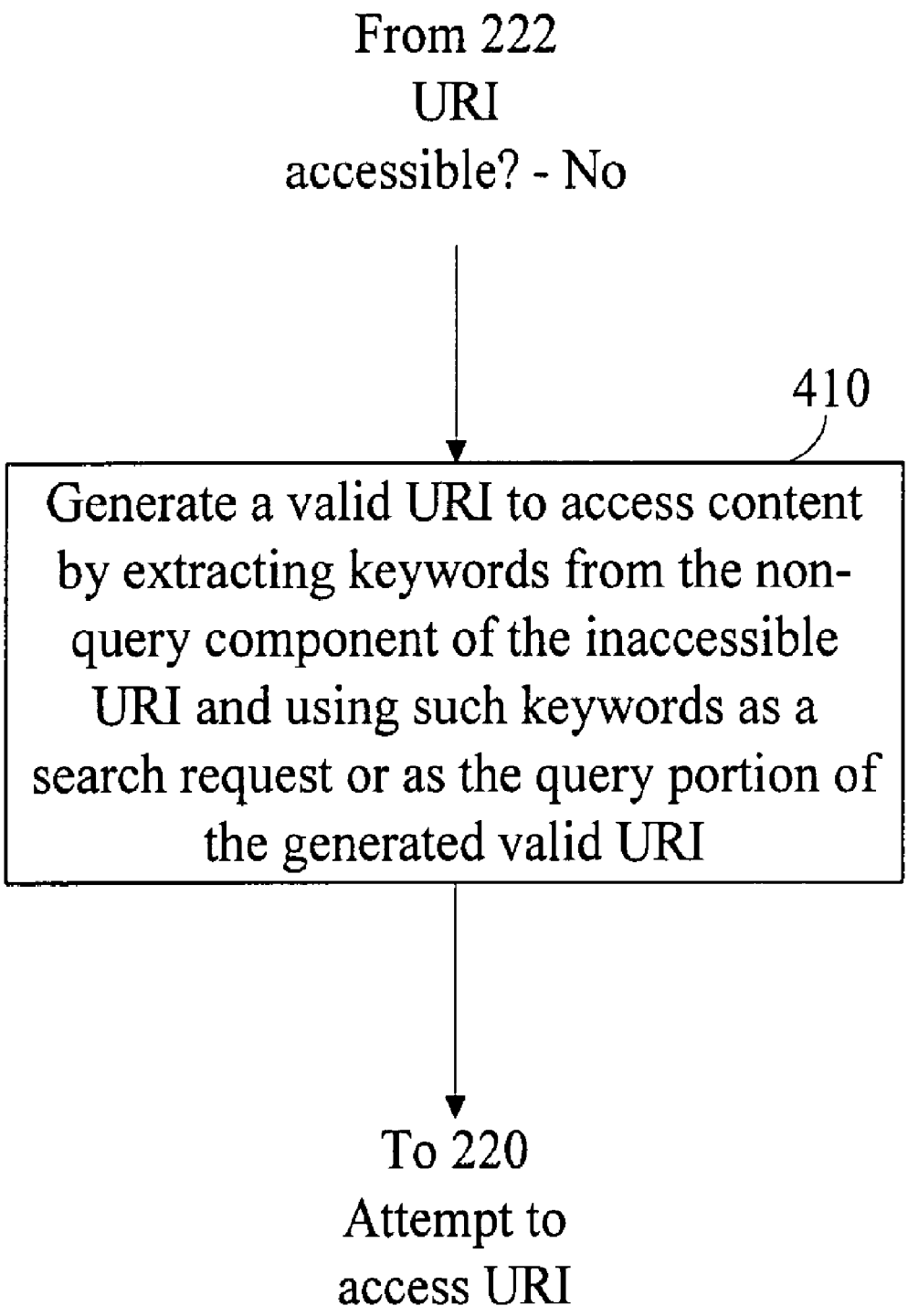
FIG. 4 is a flowchart illustrating the steps performed for generating a valid URI in response to determining that an existing valid URI is inaccessible in accordance with the present invention.

FIG. 4 is a flowchart illustrating the steps performed for generating a valid URI in response to determining that an existing valid URI is inaccessible. When a valid URI is determined in step 222 to be not accessible, then a valid URI may be generated in step 410 to access content by extracting keywords from the non-query component URI (e.g., directory, domain, port, or fragment, etc.) of the inaccessible URI and using such keywords as a search request or as the query portion of the generated valid URI. After valid URI generation in step 410 an attempt may be made in step 220 to access the URI.

In effect, the non-query portion of a first URI may be used in the query portion of a second URI to generate dynamic content. Validity of URI syntax is explained in T. Berners-Lee, "Informational RFC (Request for Comment) 1630: Universal Resource Identifiers in WWW—A Unifying Syntax for the Expression of Names and Addresses of Objects on the Network as used in the World-Wide Web", Internet Engineering Task Force (IETF), June 1994, "http://www.faqs.org/rfcs/rfc1630.html", which is herein incorporated by reference.

Typically, when a HTTP request is submitted to access a URI that does not exist, an error 404 code is returned from the requested web server, and in turn, a script may be executed to redirect and display a gen-eric web page informing the user of the error 404 code. A modification may be made to the script to generate an accessible URI by creating the appropriate directories or files on the web server in response to an error 404 code (or any other applicable error code from the 300 series, 400 series, or 500 series) such that when the HTTP request is resubmitted the URI exists and is accessible.

Figure 5:
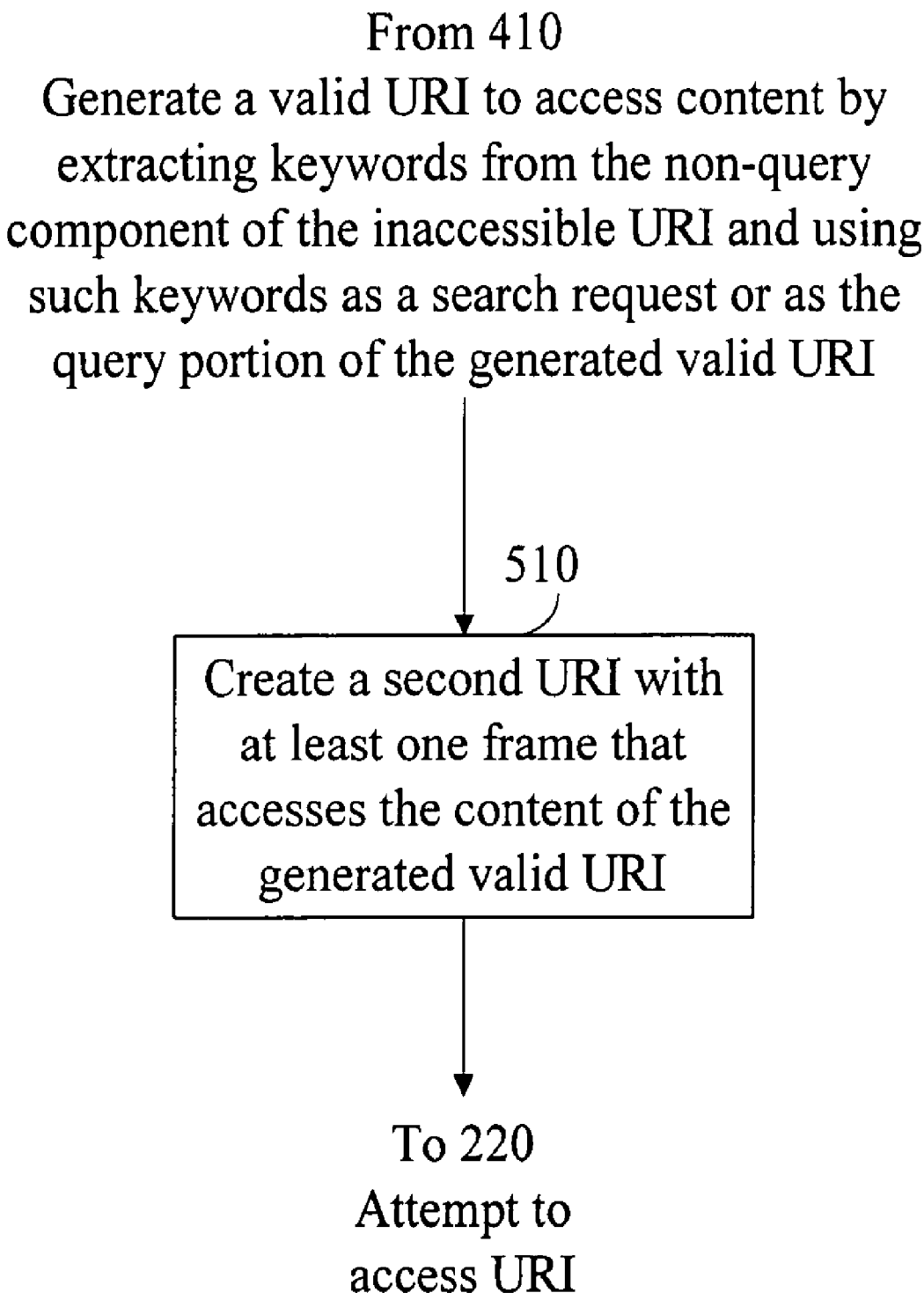
FIG. 5 is a flowchart illustrating the steps performed for generating a frame having an accessible URI in accordance with the present invention.

FIG. 5 is a flowchart illustrating the steps performed for generating a frame having an accessible URI. After valid URI generation in step 410, a script may be executed in step 510 to create a second accessible URI by adding the appropriate directories and files. The content of the newly created file may include at least one frame that displays the content of the valid generated URI. After the second accessible URI is created, an attempt may be made in step 220 to access the second URI.

Figure 6:
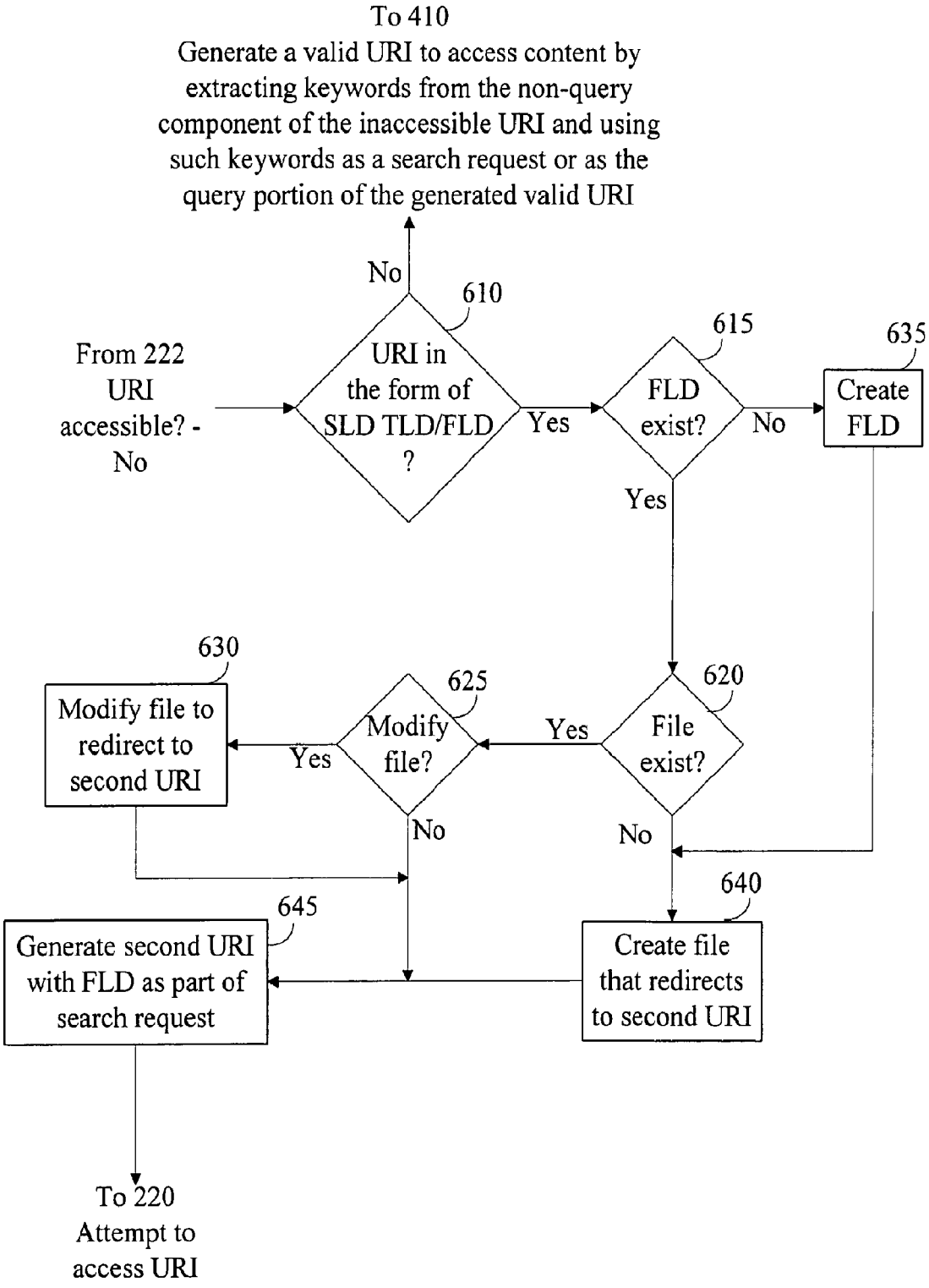
FIG. 6 is a flowchart illustrating the steps performed for creating files or directories as needed to form an accessible URI in accordance with the present invention.

FIG. 6 is a flowchart illustrating the steps performed for creating files or directories as needed to form an accessible URI. When it is determined in step 222 that a valid URI is not accessible it may then be further determined in step 610 whether the URI has the minimum form of "scheme:// SLD.TLD/FLD" where the domain name is "SLD.TLD" and the path is "/FLD", which in this case represents a first level directory (FLD). If the URI is not of the minimum form then steps (such as 410 and/or 510) may be performed. When it is determined in step 610 that the URI is of the minimum form, then it may be determined in step 615 whether the FLD exists. If the FLD exists, then it may be further determined in step 620 whether a file exists within the FLD. If a file exists, then it may be determined in step 625 whether the content of the file requires modification (e.g., META tag for purpose of URI redirection). If modification is needed then the content of the file may be modified in step 630 as necessary. If the FLD does not exist, then a FLD may be created in step 635. When the FLD is created or when the FLD exists but a file within the FLD does not exist, then a file within the FLD may be created in step 640. When it is determined in step 620 that the file already exists and does not need modification in step 625 or the file is created in step 640 or the existing file is modified in step 635 then a second URI may be generated in step 645 including the FLD as part of a search request. After the accessible URI is created, an attempt may be made in step 220 to access the URI.

For example, a device receives the input "http://update.to/news". When it is determined that the input is a valid URL (URL is a subset of a URI), a HTTP GET request is submitted to retrieve its content. A "404 error code" is received in response to the request indicating that no such URL exists. As practiced by those skilled in the art, the "404 error code" is commonly redirected to display a gen-eric informative page alerting the user that no such URL exists. Advantage may be taken by modifying the redirect script.

The modified script may be executed upon the "404 error code" and determines that a "/news" directory does not exist and is created. Furthermore, an "index.htm" is created in the "news" directory serving as a default file for the URL listed above. The content of the file includes a <META> tag which may be used to redirect the URL to another URL such as "http://update.to/cgi-bin/update.cgi?search=news" which serves as a dynamic output.

For instance, the input "update.to/news" becomes equivalent to "http://update.to/news/index.htm" and includes within the "index.htm" file the following <META> tag:

<META HTTP-EQUIV=Refresh CONTENT="5; URL=http://update.to/cgi-bin/update.cgi?search=news"> which communicates to a device that interprets HTML to load the URL "hftp://update.to/cgi-bin/update.cgi?search=news" 5 seconds after the current document "http://update.to/news/index.htm" has finished loading. Advertising may be displayed by selecting an ad from an advertising cache 190 that corresponds to any URI components or the like before automatic URI redirection. Advertisement selection is explained in U.S. Provisional Application Ser. No. 60/153,594 filed Sep. 13, 1999, by Schneider entitled "Method and apparatus for using a portion of a URI to select and display advertising." In another example, the content of the file may include a <FRAME> tag, which may be used to access content from "http://update.to/cgi-bin/update.cgi?search=news".

In effect, shorter URLs may be generated in real time or on-the-fly when necessary and used as a substitute or proxy for longer URLs. Though any filename may be used, it is a preferred aspect to use "index.htm" as a frame or redirect so the proxy URL is even shorter in string length. A shorter URL makes it easier for a user to remember the URL for future use. The invention is not limited to using only a FLD as a search request. Any directory or combination of directory levels may be either generated on the fly or used as a search request. In addition to using the directory portion of a URI as a search request, a domain (e.g., SLD) or any combination of domain levels may in turn be used to generate a query as well. For example, a subdomain may be generated to create the FQDN "news.update.to" having the minimum form of "scheme:// 3LD.SLD.TLD", which may be used to access content from "http://update.to/cgi-bin/update.cgi?search=news".

Analysis from major online search engines show that more than 90% of all search requests include three keywords or less. For instance, the search request "coffee and cream and sugar" can yield "http://example.com/coffee/cream/sugar/index.htm". In turn, the input "example.com/coffee/cream/sugar" can generate search results thereby combining the step of searching by entering in a web address or URI to search. Boolean logic can be applied to extend variations for simple search requests. For example, the search request "coffee or cream or sugar" yields "http://example.com/coffee.cream.sugar/index.htm" whereas the search request "coffee or cream and sugar" yields "http://example.com/coffee.cream/sugar/index.htm". In effect, URI notation can be used a system to generate a Boolean search request from the URI or vice-versa.

Figure 7:
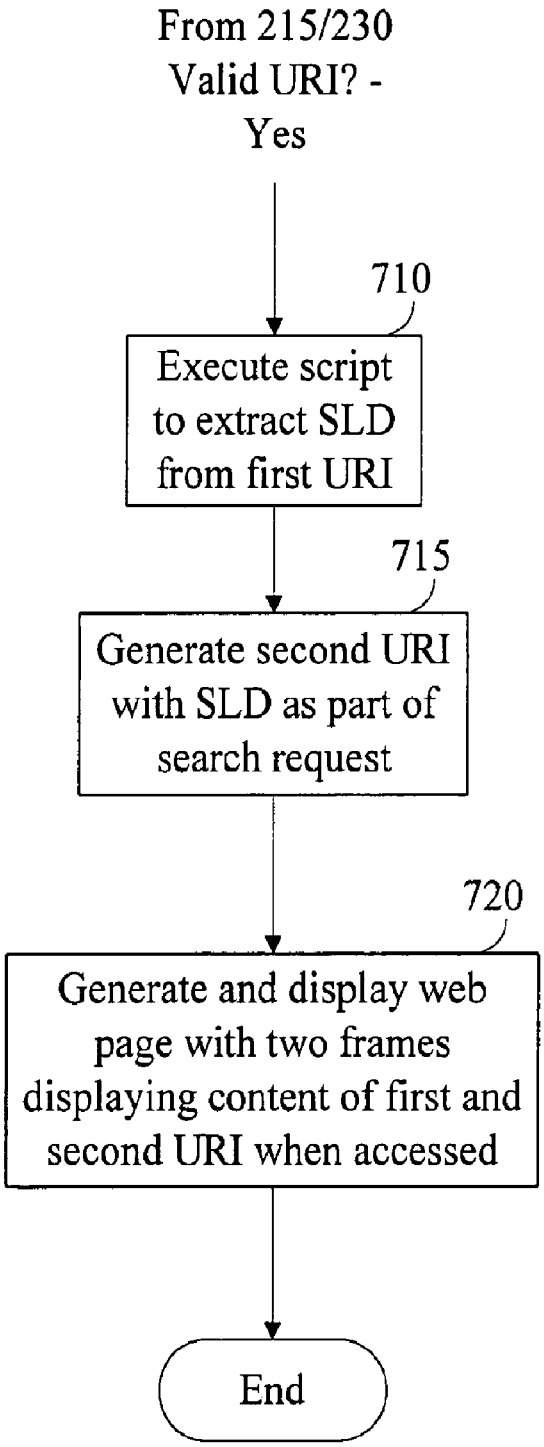
FIG. 7 is a flowchart illustrating the steps performed for extracting a domain to be used as a search request in accordance with the present invention.

FIG. 7 is a flowchart illustrating the steps performed for extracting a domain to be used as a search request. When the input 210 is a valid 215 URI or a valid URI is generated in step 230 and the configuration settings 174 indicate that domain identifier extraction may be used (e.g., SLD) then a script may be executed to extract in step 710 the SLD from the valid URI (215, 230) and a second URI may be generated in step 715 by using the SLD as part of a search request. The script generates a web page having two frames. The first frame links to the valid URI and the second frame links to the second URI which displays content when accessed relating to the use of SLD as a keyword in a search request.

Figure 8:
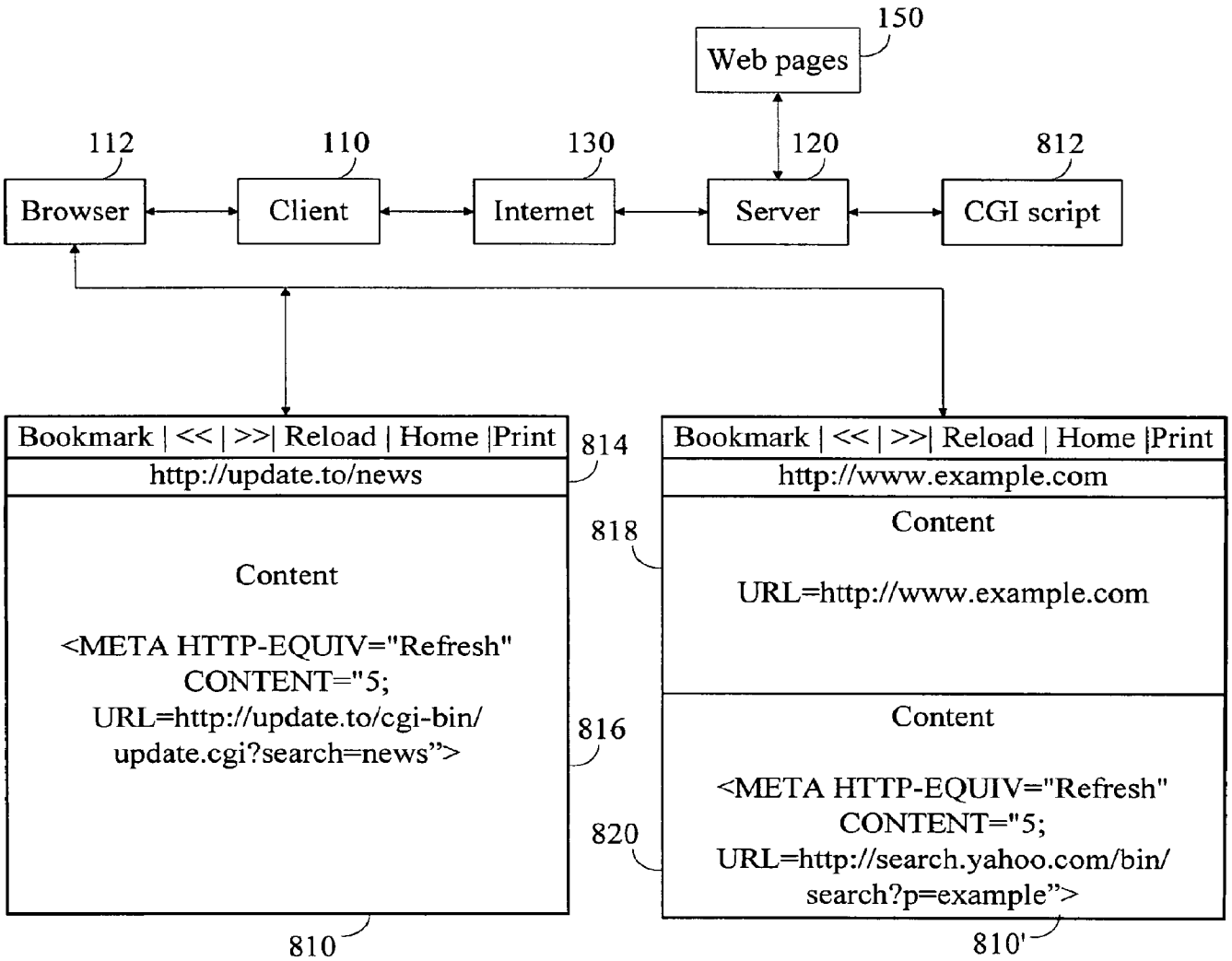
FIG. 8 is a diagram depicting how results may be displayed in a web browser in accordance with the present invention.

FIG. 8 is a diagram depicting how results may be displayed in a web browser. A client 110 web browser 112 having a web page 810 is used to connect to a server 120 via the Internet 130 that runs a CGI script 812. The location field of the web browser 112 is suppressed and the web page 810 displays at least two frames. The first frame is the web based location field 814 and the second frame 816 is used to display the contents 150 of a web address. An input device (e.g., keyboard, mouse, pen light, touch screen, or microphone, etc.) of a client computer or network access apparatus 110 is used to receive a web address as input either directly from a hyperlink (not shown) in the web page 810, or from the location field 814 of the web page 810. A URL GET request is generated from the input and the browser 112 forwards the request to a server 120, which processes the request by executing a CGI script 812 to determine accessibility 204. An accessible URI 206 may be generated and the requested page 150 is sent to the browser 112. The content 150 of the URI may be displayed (as discussed in FIG. 6 with a specific example) in the second frame 816 of the web page 810. The location field 814 of the first frame may either persist by displaying the input or is cleared out for entry of another web address.

Another web page 810' (as discussed in FIG. 7) having a location field that is not suppressed may be displayed by using a different CGI script 812. A URL GET request may be generated from the input and the browser 112 forwards the request to a server 120, which processes the request by executing a CGI script 812 to determine accessibility. An accessible URI may be generated and the requested page 150 is sent to the browser 112. The content 150 of the URI may be displayed in a first frame 818 of the web page 810' whereas the content of the second frame 820 may be dynamically generated by corresponding the extracted SLD from the URI as a search term in a second URI. By using the steps illustrated in FIG. 7, when a first URI "http://www.example.com" is received as input, a script extracts "example" from the URI and generates a second URI "http://search.yahoo.com/bin/search?p=example". Both the first URI and second URI are generated as frames and displayed as a web page 810'.

Though the above aspects demonstrate how URIs may be accessed based upon a web-based version of a location field, similar teachings may be applied to those skilled in the art by providing a user interface element such as a text box object as input. The text box object may be located anywhere and on any web page including a text box that may be embedded or displayed as part of an on-line advertisement. The text box object may be used in a stand-alone application or stored on magnetic and/or optical media that may be non-volatile, writable, removable, or portable. The text box object may be incorporated as an applet or servlet and embedded in other applications. The text box may be integrated in the task bar or any part of the GUI's OS, or the OS bypassed and a user interface element overlaid as a graphic on a display device based on modifications to a video card and/or it's associated firmware or software drivers. A command line text box may be further overlaid as an interactive object in other embodiments such as Internet television, cable television, digital television, or interactive television through an Internet appliance or set top box.

Those skilled in the art may make and use software program that functions as a browser plug-in. Such a program may be downloaded and installed for integration into the command line of a device or location field 154 of a browser program 112. Modifying the source code of the browser program 112 itself may be more desirable, in effect, enabling tens of millions of users to take advantage of more creative ways to use input as a means to access a valid URI.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

What is claimed is:

1. A method for generating newly created information comprising:

a user intentionally submitting a request to locate a file that does not exist on a server, said request including a Uniform Resource Identifier (URI) having at least one of a scheme, one or more domains, port, path, one or more directory names, and one or more file names;

receiving, at said server, said request to locate said file from said server;

determining that said file can not be located on said server;

extracting at least one keyword from said at least one of a scheme, one or more domains, port, path, one or more directory names, and one or more [tile] *file* names;

generating and performing a search request having said at least one keyword to at least one Internet search engine provider to obtain at least one web page including said at least one keyword; and, dynamically generating and providing said newly created information to said user wherein said newly created information includes results of said search request from said Internet search engine provider.

2. The method, as set forth in claim 1, wherein said URI can be represented as "scheme://SLD.TLD/FLD/index.htm" whereby SLD.TLD is a domain name, FLD is a first level directory path, and index.htm is a default file.

3. The method, as set forth in claim 2, further including creating said FLD and said default file when it is determined that said file can not be located on said server.

4. The method, as set forth in claim 3, wherein said default file is capable of dynamically providing said newly created information to said user.

5. The method, as set forth in claim 1, wherein said URI can be represented as "scheme://3LD.SLD.TLD/index.htm" whereby SLD.TLD is a domain name, 3LD is a subdomain of said domain name, and index.htm is a default file.

6. The method, as set forth in claim 5, further including creating said 3LD and said default file when it is determined that said file can not be located on said server.

7. The method, as set forth in claim 6, wherein said default file is capable of dynamically generating said newly created information to said user.

8. The method, as set forth in claim 1, wherein said search request includes [boolean] *Boolean* logic translated from said path of said URI.

9. The method, as set forth in claim 1, further including providing at least one advertisement corresponding to said at least one keyword before dynamically generating said newly created information to said user.

*10. A method for presenting information, the method comprising:*

*receiving a user request at a computing device, the user request comprising a Uniform Resource Identifier (URI) comprising at least one of a scheme, one or more domains, port, path, one or more directory names, or one or more file names;*

*determining whether the user request corresponds to a valid existing resource available from the computing device;*

*the computing device extracting at least one keyword from the at least one of a scheme, one or more domains, port, path, one or more directory names, or one or more file names in response to determining the user request does not correspond to a valid existing resource;*

*the computing device generating a search request based on at least the at least one keyword to obtain an identification of at least one resource corresponding to the at least one keyword; and*

*the computing device communicating the identification of the at least one resource corresponding to the at least one keyword.*

*11. The method according to claim 10, wherein generating a search request comprises generating a search request to an Internet search engine, and wherein communicating the identification of the at least one resource comprises communicating over the Internet.*

*12. The method according to claim 10, wherein the URI comprises a representation comprising "HLD.TLD/DP" whereby HLD.TLD is a domain name comprising a top level*

*domain (TLD) and at least one hierarchal second or higher level domain name (HLD), and DP is a directory path.*

*13. The method according to claim 12, further comprising creating the DP and a resource corresponding to the URI in response to the URI not corresponding to a valid existing resource.*

*14. The method according to claim 13, wherein the resource is adapted to dynamically provide newly created information.*

*15. The method according to claim 10, wherein the URI comprises a representation comprising "3LD.SLD.TLD" whereby SLD.TLD is a domain name comprising a top level domain name (TLD) and a second level domain name (SLD), and 3LD is a subdomain of the second level domain name.*

*16. The method according to claim 15, further comprising creating the 3LD and a resource in response to the URI not corresponding to a valid existing resource.*

*17. The method according to claim 16, wherein the resource is capable of dynamically generating newly created information.*

*18. The method according to claim 10, wherein the query comprises Boolean logic translated from a path of the URI.*

*19. The method according to claim 10, further comprising providing information relating to at least one advertisement relating to the at least one keyword.*

*20. A non-transitory tangible computer readable medium having instructions stored thereon, the instructions comprising:*

*instructions for receiving a user request to locate a file, the user request including a Uniform Resource Identifier (URI) having at least one of a scheme, one or more domains, port, path, one or more directory names, or one or more file names;*

*instructions for determining that the file cannot be located on a server;*

*instructions for extracting at least one keyword from the at least one of a scheme, one or more domains, port, path, one or more directory names, or one or more file names;*

*instructions for generating a search request having the at least one keyword to obtain at least one web page; and,*

*instructions for dynamically generating and providing newly created information wherein the newly created information comprises, at least in part, information that leads to the at least one web page.*

*21. A non-transitory tangible computer readable medium having instructions stored thereon that cause a computing device to perform operations comprising:*

*determining whether a user request comprising a Uniform Resource Identifier (URI) comprising at least one of a scheme, domain, port, path, directory name, or file name corresponds to an existing resource;*

*extracting at least one keyword from the at least one of a scheme, domain, port, path, directory name, or file name in response to determining that the user request does not correspond to an existing resource;*

*generating a query based on at least the at least one keyword to obtain an identification of at least one resource corresponding to the at least one keyword; and*

*communicating the identification of the at least one resource corresponding to the at least one keyword.*

*22. The non-transitory tangible computer readable medium according to claim 21, wherein generating a query comprises generating a search request to an Internet search engine and communicating the identification of the at least one resource comprises communicating via the Internet.*

*23. The non-transitory tangible computer readable medium according to claim 21, wherein the URI comprises a representation comprising "HLD.TLD/DP" whereby HLD.TLD is a domain name comprising a top level domain (TLD) and at least one hierarchal second or higher level domain name (HLD), and DP is a directory path.*

*24. The non-transitory tangible computer readable medium according to claim 23 having instructions stored thereon that cause the computing device to perform operations further comprising:*

*creating the DP and a resource corresponding to the URI in response to determining that the URI does not correspond to an existing resource.*

*25. The non-transitory tangible computer readable medium according to claim 21 having instructions stored thereon that cause the computing device to perform operations further comprising:*

*providing information relating to at least one advertisement relating to the at least one keyword.*

*26. A system, comprising:*

*at least one interface adapted to receive a user request, the user request comprising a Uniform Resource Identifier (URI) comprising at least one of a scheme, domain, port, path, directory name, or file name; and*

*at least one computing device adapted to:*

*determine whether the user request corresponds to an available resource;*

*extract at least one keyword from the at least one of a scheme, domain, port, path, directory name, or file name in response to determining that the request does not correspond to an available resource;*

*generate a query based on at least the at least one keyword to obtain an identification of at least one resource corresponding to the at least one keyword; and*

*communicate through the at least one interface, at least one of the query or the identification of the at least one resource corresponding to the at least one keyword.*

*27. The system according to claim 26, wherein generating a query comprises generating a search request to an Internet search engine, and communicating at least one of the query or the identification of the at least one resource comprises communicating over the Internet.*

*28. The system according to claim 26, wherein the URI comprises a representation comprising "HLD.TLD/DP" whereby HLD.TLD is a domain name comprising a top level domain (TLD) and at least one hierarchal second or higher level domain name (HLD), and DP is a directory path.*

*29. The system according to claim 26, wherein the computing device is further adapted to create the DP and a new resource corresponding to the URI in response to the computing device determining that the URI does not correspond to an available resource.*

*30. The system according to claim 29, wherein the computing device is adapted to create the new resource to be adapted to dynamically provide newly created information.*

*31. The system according to claim 26, wherein the URI comprises a representation comprising "3LD.SLD.TLD" whereby SLD.TLD is a domain name comprising a top level domain name (TLD) and a second level domain name (SLD), and 3LD is a subdomain of the second level domain name.*

*32. The system according to claim 31, wherein the computing device is adapted to create the 3LD and a default resource in response to the computing device determining that the URI does not correspond to an available resource.*

*33. The system according to claim 32, wherein the computing device is adapted to create the default resource to be adapted to dynamically generate newly created information.*

*34. The system according to claim 26, wherein the computing device is adapted to generate the query comprising Boolean logic translated from a path of the URI.*

*35. The system according to claim 26, wherein the computing device is further adapted to:*

*provide information relating to at least one advertisement relating to the at least one keyword.*

* * * * *

UNITED STATES PATENT AND TRADEMARK OFFICE

CERTIFICATE OF CORRECTION

PATENT NO. : RE43,690 E
APPLICATION NO. : 12/044804
DATED : September 25, 2012
INVENTOR(S) : Schneider et al.

It is certified that error appears in the above-identified patent and that said Letters Patent is hereby corrected as shown below:

On the Title Page, item (56), under "OTHER PUBLICATIONS", in Column 2, Line 1, delete "the Telephone" and insert -- The Telephone --, therefor.

On Page 5, item (56), under "OTHER PUBLICATIONS", in Column 2, Line 12, delete "al.;" and insert -- al., --, therefor.

On Page 5, item (56), under "OTHER PUBLICATIONS", in Column 2, Line 13, delete "http:--ww.faqs.org-rfcs-rfc954.html." and insert -- http:--www.faqs.org-rfcs-rfc954.html. --, therefor.

On Page 5, item (56), under "OTHER PUBLICATIONS", in Column 2, Line 25, delete "Schol," and insert -- School, --, therefor.

On Page 5, item (56), under "OTHER PUBLICATIONS", in Column 2, Line 38, delete "new_pr_51700.hmtl." and insert -- new_pr_51700.html. --, therefor.

In Column 2, Line 47, delete "URLs" and insert -- URIs --, therefor.

In Column 12, Line 34, in Claim 8, delete "said" and insert -- [said] *a* --, therefor.

Signed and Sealed this
Twenty-sixth Day of February, 2013

Teresa Stanek Rea
*Acting Director of the United States Patent and Trademark Office*